US008830627B2

(12) United States Patent
Sugiura et al.

(10) Patent No.: US 8,830,627 B2
(45) Date of Patent: Sep. 9, 2014

(54) MAGNETIC HEAD, METHOD FOR PRODUCING THE MAGNETIC HEAD, AND MAGNETIC RECORDING/REPRODUCING APPARATUS

(71) Applicant: Hitachi, Ltd., Tokyo (JP)

(72) Inventors: Kenji Sugiura, Odawara (JP); Katsuro Watanabe, Hitachiota (JP); Masukazu Igarashi, Kawagoe (JP); Yo Sato, Odawara (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 13/735,163

(22) Filed: Jan. 7, 2013

(65) Prior Publication Data

US 2013/0222941 A1 Aug. 29, 2013

(30) Foreign Application Priority Data

Feb. 23, 2012 (JP) ................... 2012-037976

(51) Int. Cl.
*G11B 5/02* (2006.01)

(52) U.S. Cl.
USPC ........................................ 360/125.3

(58) Field of Classification Search
USPC ........................................ 360/125.3
See application file for complete search history.

(56) References Cited

U.S. PATENT DOCUMENTS

| | | | | |
|---|---|---|---|---|
| 8,094,399 B2 * | 1/2012 | Roppongi et al. | ............ | 360/55 |
| 8,184,411 B2 * | 5/2012 | Zhang et al. | ............... | 360/324.2 |
| 8,274,811 B2 * | 9/2012 | Zhang et al. | .................. | 365/145 |
| 8,279,557 B2 * | 10/2012 | Kautzky et al. | ............ | 360/234.5 |
| 8,305,711 B2 * | 11/2012 | Li et al. | ..................... | 360/125.31 |
| 2005/0023938 A1 | 2/2005 | Sato et al. | | |

FOREIGN PATENT DOCUMENTS

JP 2005-25831 1/2005

OTHER PUBLICATIONS

Jian-Gang Zhu et al., Microwave Assisted Magnetic Recording, IEEE Transactions on Magnetics, Jan. 2008, pp. 125-131, vol. 44, No. 1.
Yiming Wang et al., Media damping constant and performance characteristics in microwave assisted magnetic recording with circular ac field, Journal of Applied Physics, 105, 07B902 (2009).
Kazuetsu Yoshida et al., Oscillation Characteristics of Oscillator for MAMR with Negative Uniaxial Anisotropy Materials, IEICE Technical Report, MR2009-14 (Jul. 2009).
Kazuetsu Yoshida et al., Spin Torque Oscillator with Negative Magnetic Anisotropy Materials for MAMR, IEEE Transactions on Magnetics, Jun. 2010, pp. 2466-2469, vol. 46, No. 6.

* cited by examiner

*Primary Examiner* — Mark Blouin
(74) *Attorney, Agent, or Firm* — Antonelli, Terry, Stout & Kraus, LLP.

(57) ABSTRACT

In a magnetic head of a high-frequency magnetic field assisted recording system, a width of a high-frequency magnetic field from an oscillator is decreased to enhance an oscillation frequency, in order to realize a high-density recording. An oscillator provided near a main pole, which generates a recording magnetic field, for generating a high-frequency magnetic field is patterned by a conventional photolithography, and then, an oxidation, nitridation, or oxynitridation is performed on the side face in a track width direction. With this process, an oxide layer, a nitride layer, or an oxynitride layer, which is made of a material of the oscillator, is formed on the side face of the oscillator in the track width direction, and the shape of the oscillator is formed to be semi-circular.

10 Claims, 30 Drawing Sheets

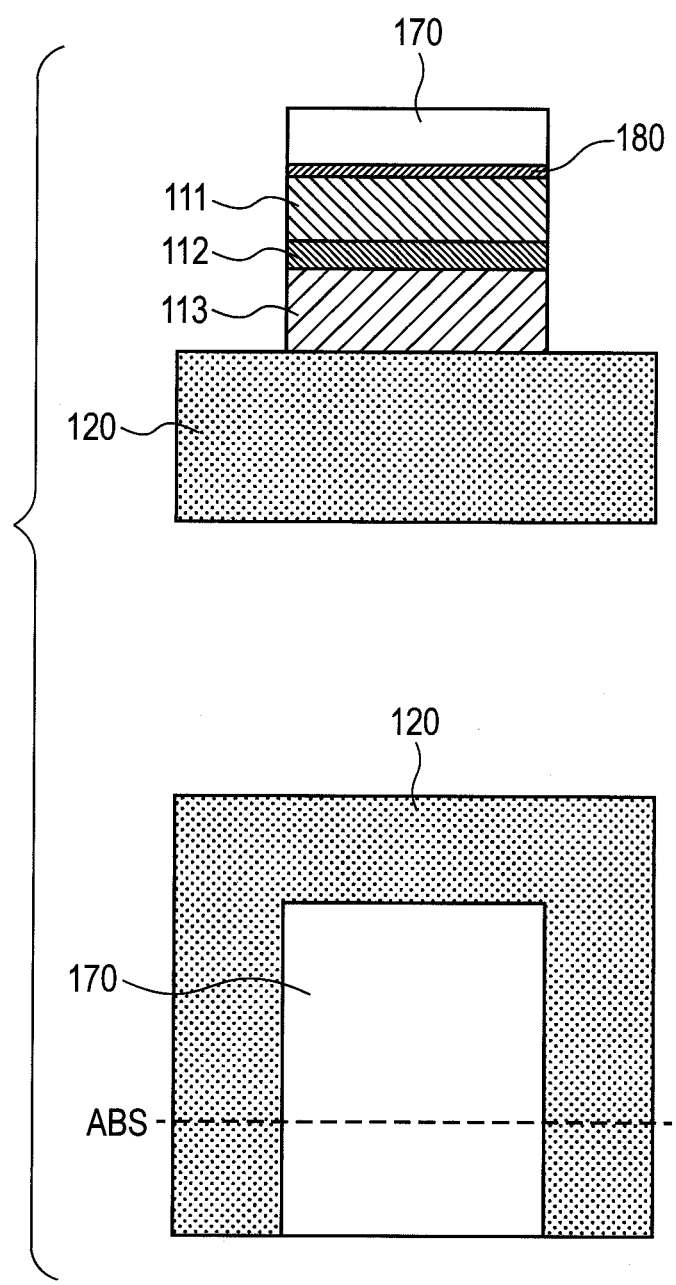

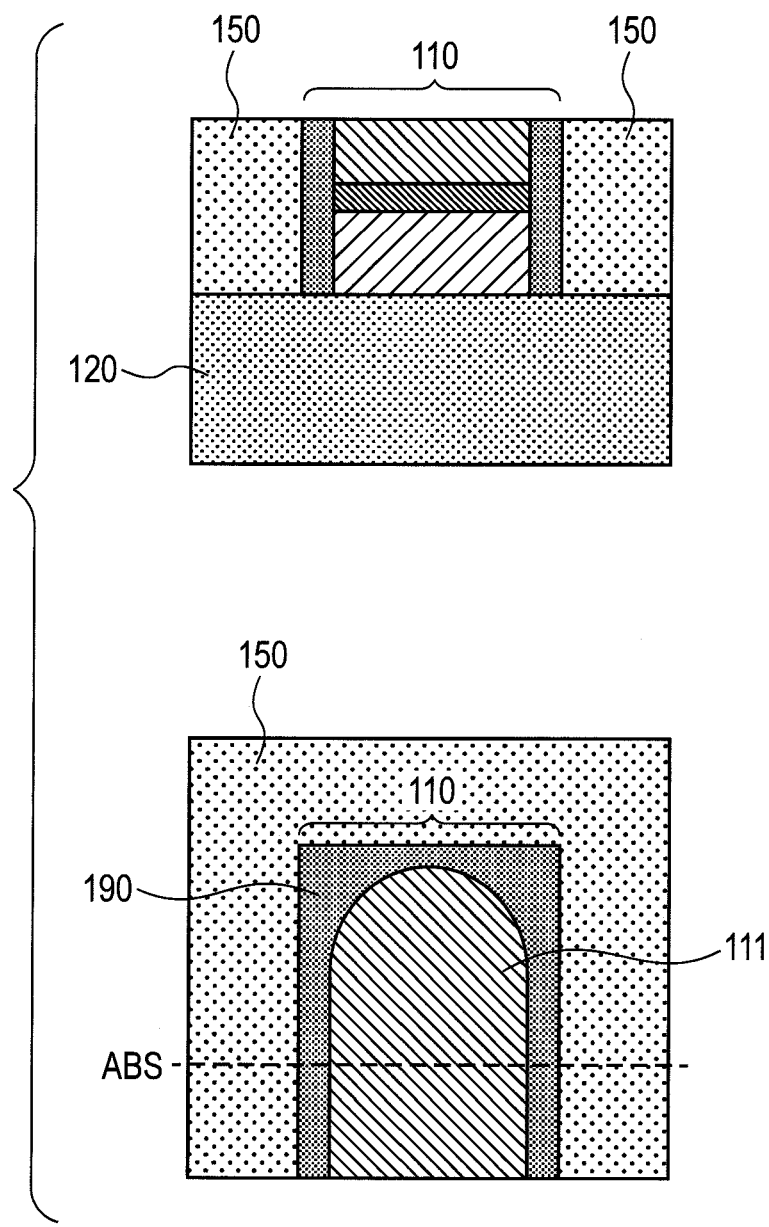

MAGNETIC HEAD, METHOD FOR PRODUCING THE MAGNETIC HEAD, AND MAGNETIC RECORDING/REPRODUCING APPARATUS

CLAIM OF PRIORITY

The present application claims priority from Japanese patent application JP 2012-037976 filed on Feb. 23, 2012, the content of which is hereby incorporated by reference into this application.

FIELD OF THE INVENTION

The present invention relates to a magnetic head, a method for producing the magnetic head, and a magnetic recording/reproducing apparatus, and more particularly to a magnetic head having a function of inducing magnetization reversal through an application of a high-frequency magnetic field to a magnetic recording medium, a method for producing the magnetic head, and a magnetic recording/reproducing apparatus including the magnetic head.

BACKGROUND OF THE INVENTION

In a magnetic recording/reproducing apparatus such as HDD (Hard Disk Drive), it is important to enhance recording capability in order to increase an areal recording density. Therefore, recent attention has been directed to assisted recording that temporarily reduces coercive force of a magnetic recording medium during the recording by applying heat or high-frequency magnetic field. A system using high-frequency magnetic field is called "microwave-assisted magnetic recording (MAMR)".

In the MAMR, a high-frequency magnetic field having a strong microwave band is applied to a region of a nanometer order to locally excite a recording medium, by which a switching field is reduced. With this state, information is recorded. However, since the MAMR utilizes magnetic resonance, a significant effect of reducing the switching field cannot be realized, unless a high-frequency magnetic field with high frequency proportional to anisotropy magnetic field of the recording medium is used. As one of measures to solve this problem, Japanese Unexamined Patent Application Publication No. 2005-025831 describes a high-frequency oscillation device for generating a high-frequency assisted magnetic field, the device having a structure in which a laminated film with a structure similar to a GMR device (giant magnetoresistance effect device) is sandwiched between electrodes. The high-frequency oscillation device can generate a high-frequency oscillating field on a local area by injecting a conductive electron, having spin fluctuation generated in the GMR structure, into a magnetic body through a non-magnet.

"Microwave Assisted Magnetic Recording", J.-B. Zhu et al., IEEE Trans. Magn., Vol. 44, No. 1, pp. 125-131 (2008) describes a technique of recording information on a magnetic recording medium having large anisotropy magnetic field. In this technique, spin torque from a spin injection pinned layer (hereinafter referred to as pinned layer) in an oscillator adjacent to a main pole of a perpendicular magnetic head is transmitted to an adjacent high-frequency magnetic field generation layer (FGL: Field Generation Layer) through Cu in an intermediate layer, and magnetization in the FGL is rotated at high speed in a plane to generate microwave (high-frequency magnetic field). "Media damping constant and performance characteristics in microwave assisted magnetic recording with circular as filed", V. Wang et al., Journal of Applied Physics 105, 07B902 (2009) describes a technique of effectively assisting magnetization reversal of a magnetic recording medium by a structure in which an oscillator is arranged between a main pole of a magnetic recording head and a trailing shield posterior to the main pole, and a rotation direction of the high-frequency magnetic field is changed according to the polarity of the recording magnetic field.

SUMMARY OF THE INVENTION

In recent years, a recording density required for a magnetic recording becomes a density exceeding 1 Tb/in$^2$. With this, a track width recorded on a magnetic recording medium becomes very small such as about 60 nm. It has been reported that the recording density equal to or higher than 1 Tb/in$^2$ can possibly be realized by the MAMR by using the techniques described in "Microwave Assisted Magnetic Recording" and "Media damping constant and performance characteristics in microwave assisted magnetic recording with circular as filed" described above. These documents describe that, even if a width of a recording head in a track width direction is wider than a width of an oscillator in the track width direction, the track width actually recorded on the medium becomes almost equal to the width of the oscillator. Specifically, in the MAMR, the width of the oscillator has to be decreased to the width almost equal to the track width to be recorded in order to enhance the track density. However, it is presumed that the width of the oscillator with the density exceeding 1 Tb/in$^2$ cannot be decreased only by a photolithography technique used in a conventional production of a magnetic head.

In the MAMR system, the recording medium is locally brought into a magnetic resonance state by applying strong high-frequency magnetic field to reduce a switching field, and with this state, information is recorded. Therefore, in order to realize the recording density exceeding 1 Tb/in$^2$, an oscillator that can stably generate a high-frequency magnetic field with a frequency of 20 GHz or higher is required. Techniques described in "Oscillation Characteristics of Oscillator for MAMR with Negative Uniaxial Anisotropy Materials", Kazuetsu Yoshida et al, IEICE Technical Report, pp. 7-12 (2009), and "Spin Torque Oscillator With Negative Magnetic Anisotropy Materials for MAMR", K. Yoshida et al., IEEE Trans. Magn., Vol. 46, No. 6, pp. 2466-2469 (2020) show that, according to the calculation, a high-frequency magnetic field with a frequency of 20 GHz or higher can stably be generated by a structure in which a material with large negative magnetic anisotropy is used as an oscillation layer, and an oscillator is formed such that its bottom face has a columnar shape directing to a track direction. It is described in these techniques that the oscillation layer with a columnar shape can generate a high-frequency magnetic field with higher frequency than an oscillation layer of a rectangular solid according to Micromagnetics simulation. Since the condition for allowing the magnetization to easily rotate in the plane of the oscillation layer is established from the viewpoint of demagnetization field or magnetostatic energy, the oscillator can stably generate a high-frequency magnetic field with high frequency. Specifically, the shape of the oscillator can greatly affect the oscillation state, but it is difficult to form a fine width realizing the density exceeding 1 Tb/in$^2$ and to control the shape only by the patterning according to the photolithography technique used in the conventional production of a magnetic head.

The present invention aims to provide a magnetic head capable of realizing a high recording density, the magnetic head using a high-frequency magnetic field assisted recording system and including an oscillator, wherein a width of the oscillator in a track width direction can be decreased to an extent that is difficult to be realized only by a conventional photolithography, and the oscillator has a shape by which the oscillator can stably generate the magnetic field with high frequency; a method of producing the magnetic head; and a magnetic recording/reproducing apparatus.

According to an aspect of the present invention, in the method for producing the magnetic head of a microwave-assisted recording (MAMR) system, the oscillator is patterned by the conventional photolithography, and then, an oxidation, nitridation, or oxynitridation is performed on the side face of the oscillator by a plasma process. Specifically, an insulation layer or high-resistivity layer such as an oxide layer, a nitride layer, or an oxynitride layer made of a material of the oscillator is formed on the side face of the oscillator on an air bearing surface in the track width direction. In this structure, the thickness of the oxide layer, the nitride layer, or the oxynitride layer in the track width direction is 0.5 nm or more, and the width of the oscillator in the track width direction except for the oxide layer, the nitride layer, or the oxynitride layer is 10 nm or more and 60 nm or less. Preferably, the shape of the oscillator covered by the oxide layer, the nitride layer, or the oxynitride layer is formed to be semi-circular projecting toward an element height direction from the air bearing surface.

According to the aspect of the present invention, the width of the high-frequency magnetic field from the oscillator in the track width direction can be decreased to an extent that is difficult to be realized only by the conventional photolithography. The present invention also provides the semi-circular oscillator that can stably generate high frequency. According to these effects, a magnetic head that can realize high-density recording can be provided.

Other problems, structures, and effects will be apparent from the description of embodiments below.

BRIEF DESCRIPTION OF THE DRAWINGS

FIG. 8C is a schematic sectional view illustrating the production process of the oscillator according to the fourth embodiment;

FIG. 8E is a schematic sectional view illustrating the production process of the oscillator according to the fourth embodiment;

DETAILED DESCRIPTION OF THE PREFERRED EMBODIMENTS

Embodiments of the present invention will be described below with reference to the drawings.

First Embodiment

Figure 1:
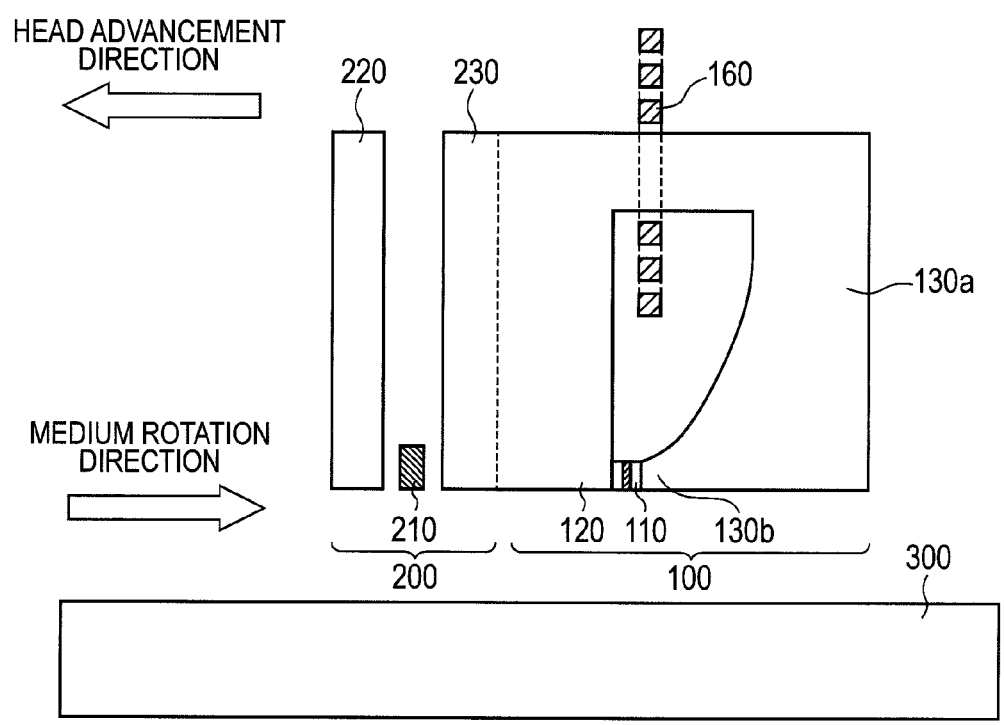
FIG. 1 is a view illustrating an example of a configuration of a magnetic head according to the present invention.

FIG. 1 is a schematic sectional view of a magnetic recording/reproducing head, according to one embodiment of the present invention, along a track direction. The magnetic recording/reproducing head (hereinafter merely referred to as magnetic head) is a magnetic head with separate recording and reproducing sections, and includes a recording section 100 and a reproducing section 200. The magnetic head records information and reproduces information to a rotating magnetic recording medium 300 such as a magnetic disk. The recording section 100 includes an oscillator 110 that generates a high-frequency magnetic field, a main pole 120 for generating a recording magnetic field, a coil 160 that excites a magnetizing field to the main pole 120, and a sub-pole 130a. In the example in FIG. 1, a trailing shield 130b is provided in the trailing direction of the main pole 120, but the trailing shield 130b is not necessarily provided. In this embodiment, the direction reverse to the advancing direction of the magnetic head with respect to the magnetic disk 300 is defined as the trailing direction, while the advancing direction of the magnetic head to the magnetic disk is defined as a leading direction.

In the example in FIG. 1, the reproducing section 200 is arranged at the head, and the recording section 100 is arranged posterior to the reproducing section, as viewed from the advancing direction of the magnetic head to the magnetic disk 300. However, the arrangement of the reproducing section 200 and the recording section 100 may be reversed. Specifically, the recording section 100 may be located at the head, and the reproducing section 200 may be located posterior to the recording section 100, as viewed from the advancing direction of the head.

The reproducing section 200 includes a reproduction sensor 210, a lower magnetic shield 220, and an upper magnetic shield 230, and reproduces a recording signal recorded on the magnetic disk 300. The reproduction sensor 210 may be a sensor having a so-called GMR (Giant Magneto-Resistive) effect, or may be a sensor having a TMR (Tunneling Magneto-Resistive) effect, for example. The reproduction sensor 210 may also be a differential reproduction sensor having two or more reproduction sensors making a response of reverse polarity to an external magnetic field. The lower magnetic shield 220 and the upper magnetic shield 230 have important role to enhance quality of a reproduction signal. Therefore, these shields had better be provided.

Figure 2:
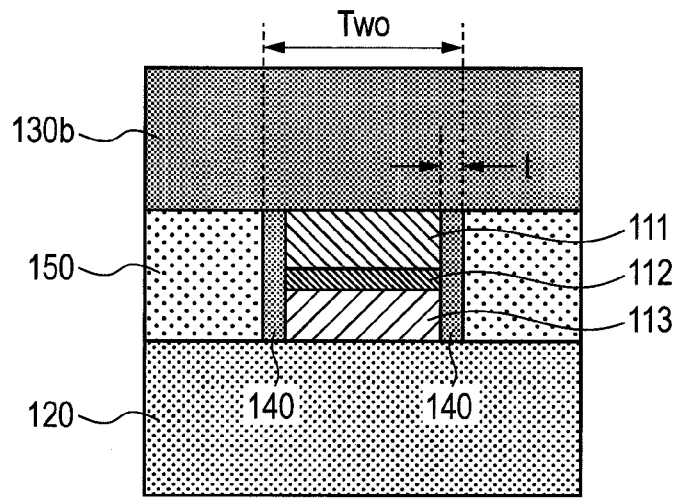
FIG. 2 is a view illustrating an example of a configuration of an oscillator of the magnetic head.

FIG. 2 is a view illustrating an example of a configuration of the recording section of the magnetic head, wherein the main pole 120 and the oscillator 110 that are components of the recording section 100 are viewed from an air bearing surface (ABS) with an upward direction being defined as the trailing direction.

The oscillator 110 is arranged between the main pole 120 and the trailing shield 130b. The oscillator 110 includes a high-frequency magnetic field generation layer (FGL) 111 that generates a high-frequency magnetic field, an intermediate layer 112 made of a material having high spin permeability, and a spin injection pinned layer (hereinafter merely referred to as pinned layer) 113 for applying spin torque to the FGL 111. The oscillator 110 is formed such that the pinned layer 113, the intermediate layer 112, and the FGL ill are stacked in this order from the main pole 120 as illustrated in FIG. 2. However, the order of the stack may be reversed such that the FGL 111, the intermediate layer 112, and the pinned layer 113 may be stacked in this order from the main pole 120.

The material of the FGL 111 is $Fe_{70}CO_{30}$, for example, and its thickness is 15 nm, for example. The saturation magnetization of $Fe_{70}Co_{30}$ is 2.4 T, so that it can generate a high high-frequency magnetic field. A magnetic body can function as the FGL 111. Instead of FeCo alloy, NiFe alloy, Heusler alloy such as CoFeGe, CoMnGe, CoFeAl, CoFeSi, CoMnSi, or CoFeSi, Re-TM amorphous alloy such as TbFeCo, or CoCr alloy. The material for the FGL 111 may also be a material having negative perpendicular magnetic anisotropy such as CoIr. The thickness of the FGL 111 may be 15 nm or more or less, but preferably, within the range of 5 nm or more and 30 nm or less. The reason for this is as follows. When the thickness is too small, the intensity of the high-frequency magnetic field excessively decreases, so that the lower limit of the thickness is set as 5 nm. When the thickness is too large, the FGL 111 has multi-domain to entail the reduction in the intensity of the magnetic field, so that the upper limit is set as 30 nm.

The intermediate layer 112 is made of Cu, for example, and its thickness is 2 nm. A non-magnetic conductive material is preferably used as the material for the intermediate layer 112. Instead of Cu, Au, Ag, or Cr can be used. The pinned layer 113 is made of Co/Ni, for example, and its thickness is 8 nm. When a material having perpendicular magnetic anisotropy is used for the pinned layer 113, the oscillation of the FGL 111 can be stabilized. The perpendicular magnetic anisotropy (Hk) of the used Co/Ni is 17 kOe. Preferable examples of the material for the pinned layer include an artificial magnetic material such as Co/Pt or Co/Pd, instead of Co/Ni.

According to the configuration of the oscillator 110 described above, the high-frequency magnetic field can be applied to the recording layer of the magnetic disk 300. The main pole 120 and the shield 130b in the present embodiment are made of CoFe alloy having large saturation magnetization and small magnetrocrystalline anisotropy.

An oxide layer 140 on a side face of the oscillator 110, which is a characteristic of the present embodiment, will next be described. As illustrated in FIG. 2, the oxide layer 140 is formed on the side face of the oscillator in the track width direction as viewed from the air bearing surface of the oscillator 110. The thickness t of the oxide layer 140 in the track width direction is 10 nm, for example. A refill insulation layer 150 such as alumina is formed on its outer side, but in the present embodiment, the outside of the oxide layer 140 is made of an oxide of an element (e.g., Co, Ni, Fe, Cu) forming the oscillator 110, not the refill insulating layer described above. This is because the oscillator 110 is formed by an oxidation such as ozone oxidation after the oscillator 110 is patterned by a photolithography.

A method for producing the magnetic head according to the present embodiment will be described later. According to this method, the size of the oscillator in the track width direction can be reduced to an extent that is difficult to be realized only by a conventional photolithography technique. This is based upon the reason described below. Specifically, the electric resistance of the oxide layer of the oscillator formed by the oxidation significantly increases more than that of a metal material forming the oscillator. Therefore, an electron conduction serving as carrier does not occur on the oxide layer of the oscillator, and hence, the high-frequency magnetic field is not generated from the oxide layer of the oscillator. From this viewpoint, the electron conduction of the metal material forming the oscillator can be inhibited not only by the oxidation but also by a nitridation or oxynitridation. Accordingly, in the present invention, the same effect can be obtained by using not only the oxide layer but also a nitride layer or an oxynitride layer. By virtue of the configuration in the present embodiment, the width of the high-frequency magnetic field generated from the oscillator 110 in the track width direction can be decreased. For clarification, the width that is patterned by the photolithography and that is in the track width direction of the oscillator including the oxide layer, nitride layer or oxynitride layer is referred to as a "physical track width", and the width that is in the track width direction of the high-frequency magnetic field emitted from the oscillator and that can actually be recorded on the magnetic recording medium is referred to as a "magnetic track width".

Figure 3:
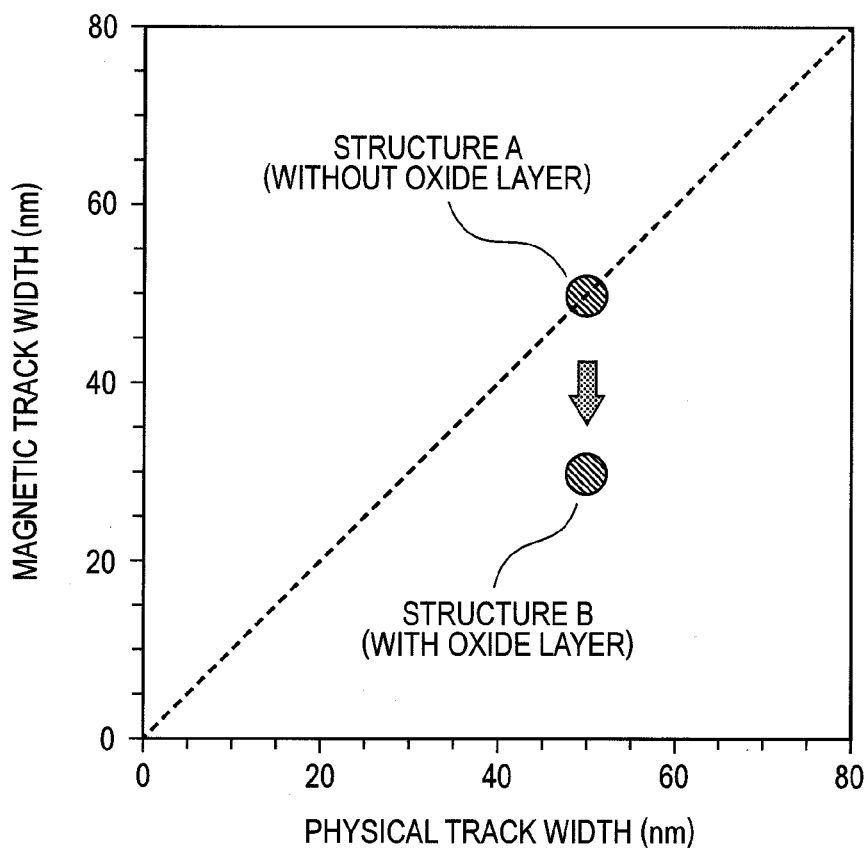
FIG. 3 is a view illustrating a magnetic track width of the oscillator according to the present invention and a magnetic track width of an oscillator according to a background art.

FIG. 3 illustrates the magnetic track width of a structure A of a conventional oscillator having no oxide layer, and the magnetic track width of a structure B of the oscillator according to the present embodiment to which the oxidation is performed. The physical track width is formed to be 50 nm according to the conventional photolithography for both the structure A and the structure B. The thickness t of the oxide layer in the structure B is 10 nm. In the structure A, the magnetic track width is 50 nm equal to the physical track width. However, in the structure B, the magnetic track width is 30 nm that is smaller than the physical track width by about 20 nm. The decreased width corresponds to the thickness of the oxide layer on both ends, and it is found that the magnetic track width can be decreased by the thickness of the formed oxide layer. The limit of the physical track width is about 50 nm by the conventional photolithography, and the magnetic track width of 30 nm cannot be realized. Accordingly, in the present embodiment, the width of the high-frequency magnetic field from the oscillator in the track width direction can be decreased to an extent that cannot be realized by the conventional photolithography, whereby the track density can be enhanced.

The thickness of the oxide layer, the nitride layer, or the oxynitride layer is 10 nm, for example. However, the thickness may be 10 nm or more, or less. The thickness of the oxide layer, the nitride layer, or the oxynitride layer is preferably set such that the required magnetic track width becomes 10 nm or more and 60 nm or less. When the magnetic track width becomes about 10 nm or less, the high-frequency magnetic field generated from the oscillator 110 is remarkably reduced. On the contrary, when the magnetic track width exceeds 60 nm, the specification of the recording density of 1 Tb/in$^2$ or higher cannot be attained, which means a merit of using the MAMR recording system is small. The lower limit of the thickness of the oxide layer, the nitride layer, or the oxynitride layer is set as 0.5 nm. This is because, even when the oxidation according to the present invention is not performed, a natural oxide layer with a thickness of 0.4 nm that corresponds to a unit cell of the oxide, which is the material of the oscillator, can be present.

Second Embodiment

The second embodiment shows not only the effect obtained by the decrease in the magnetic track width in the first embodiment but also an effect of increasing the oscillation frequency of the high-frequency magnetic field from the oscillator by the formation of the oxide layer, the nitride layer, or the oxynitride layer.

Figure 4:
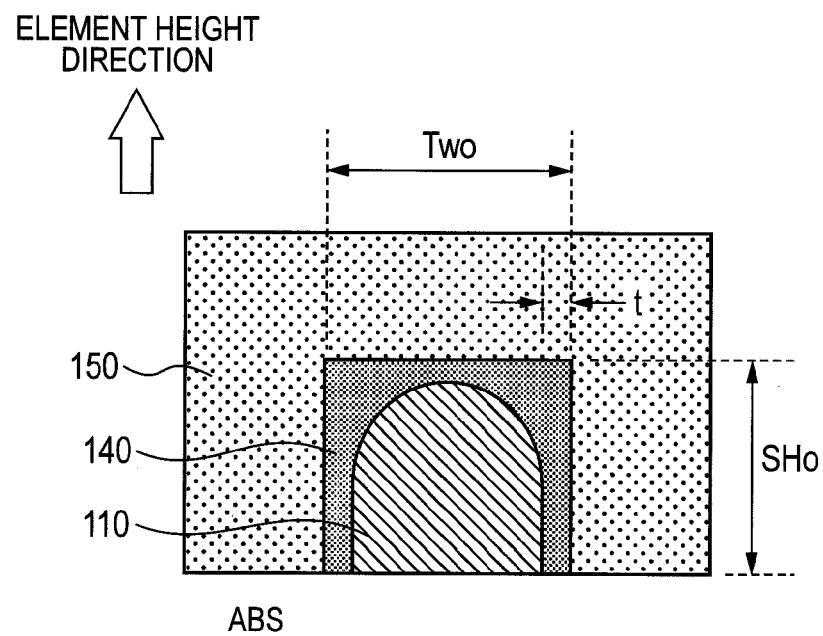
FIG. 4 is a schematic view of the oscillator, viewed from a trailing, according to one embodiment of the present invention.

FIG. 4 is a schematic view of the oscillator in the recording head provided with the oxide layer 140 viewed from the trailing direction with the air bearing surface facing downward. The oxide layer 140 may be the nitride layer or the oxynitride layer. The feature of this embodiment is that the oscillator 110 covered by the oxide layer 140 has a semi-circular shape projecting in an element height direction. In other words, the oxide layer 140 is curved in the direction in which the oxide layer 140 spreads to the inside of the oscillator 110 from the air bearing surface to the far side in the element height direction. Like the first embodiment, the oxide layer 140 according to the present embodiment is formed by the oxidation such as ozone oxidation after the oscillator 110 is patterned by the photolithography, and it is made of an oxide of an element (e.g., Co, Ni, Fe, Cu) forming the oscillator 110. The thickness t of the oxide layer 140 in the track width direction is 10 nm, for example. The refill insulating layer 150 such as alumina is formed around the oxide layer 140. The oscillator 110 including the oxide layer 140 is formed to have a rectangular shape by the patterning in the conventional photolithography. As illustrated in FIG. 4, the width of the oscillator 110 in the track width direction is specified as Two, and the width in the element height direction is specified as SHo, whereby the oscillator 110 can be appropriately designed within the range that can be patterned by the photolithography. It is preferable that the SHo is designed to be twice to five times Two in order to make the domain in the FGL single-domain.

Figure 5:
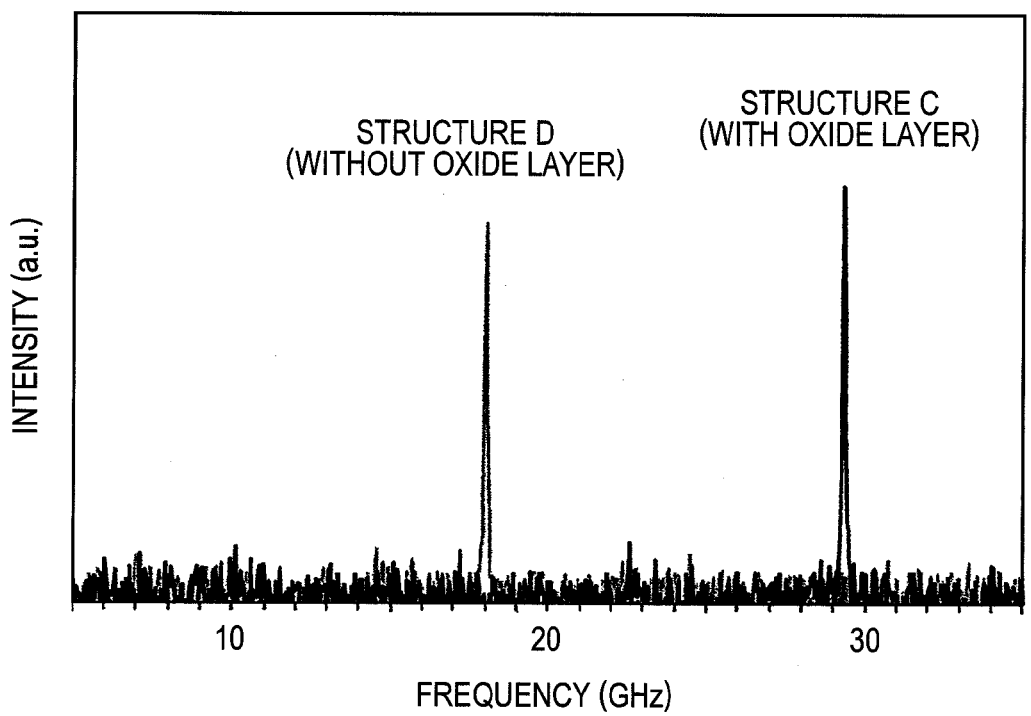
FIG. 5 is a view illustrating an oscillation spectrum of the oscillator according to one embodiment of the present invention and the oscillator according to the background art.
Figure 6:
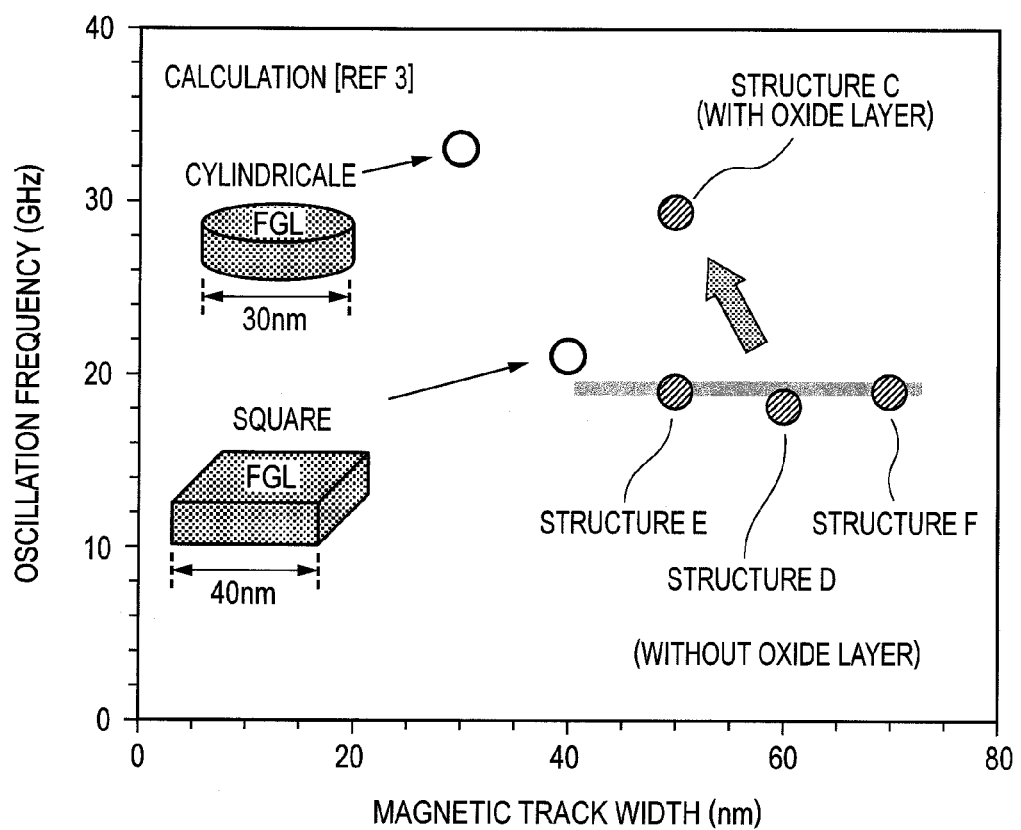
FIG. 6 is a view illustrating a relationship between the magnetic track width and the oscillation frequency of the oscillator.

The effect of the present embodiment will be described with reference to FIGS. 5 and 6. FIG. 5 illustrate the oscillation spectrum of the oscillator including the oxide layer (structure C) according to the present embodiment and the oscillation spectrum of the oscillator having no oxide layer (structure D) according to the background art for comparison. The physical track width is Two=SHo=60 nm for both the structures C and D, and the thickness t of the oxide layer in the structure C is 5 nm. In the conventional structure, the oscillation peak appears near the frequency of 18 GHz, while in the structure C according to the present embodiment, the peak can be confirmed near 30 GHz that is higher than 18 GHz.

In order to confirm that the enhancement in the frequency is brought by the shape of the oscillator, not by the size, a structure E having a conventional structure without an oxide layer and with Two (=SHo) of 50 nm, and a structure F having a conventional structure without an oxide layer and with Two (=SHo) of 70 nm are formed. The oscillation frequencies of the structures E and F are illustrated in FIG. 6 together with the frequencies of the structures C and D. An abscissa axis indicates the magnetic track width. The oscillation frequency is almost the same even if the magnetic track width is decreased or increased in the conventional oscillator having the rectangular shape. On the other hand, the oscillator having the effective semi-circular shape according to the present embodiment can generate the high oscillation frequency even with the equivalent magnetic track width. This shows that the effect of increasing the frequency is attained by the shape of the oscillator formed with the oxide layer. FIG. 6 also illustrates calculation results, indicated by white circles, described in "Oscillation Characteristics of Oscillator for MAMR with Negative Uniaxial Anisotropy Materials" described above. In the present embodiment, the increase in the oscillation frequency similar to the case where the oscillator is formed to have a cylindrical shape is obtained, and this supports the effect by which the shape of the oscillator becomes semi-circular due to the formation of the oxide layer. Accordingly, even if the size is very small such as exceeding 1 Tb/in$^2$, the shape of the oscillator can be formed to be semi-circular due to the formation of the oxide layer, whereby the high-frequency magnetic field with a high frequency of about 30 GHz or higher can stably be generated.

Third Embodiment

The method for producing the oscillator 110 in the recording section will be described with reference to process drawings in FIGS. 7A to 7E. The present embodiment describes the case where the shape of the oscillator 110 becomes semicircular due to the formation of the oxide layer 140 described in the second embodiment. In FIGS. 7A to 7E, the upper one is a schematic view of a cross-section perpendicular to a top surface of a substrate, as the oscillator 110 is viewed from the air bearing surface during the production process of the magnetic head, while the lower one is a schematic view, as the oscillator 110 is viewed from the trailing direction with the air bearing surface facing downward. ABS in these figures indicates a final position of the air bearing surface of the head. The portion near the substrate from the main pole 120 is not illustrated in FIGS. 7A to 7E.

Figure 7A:
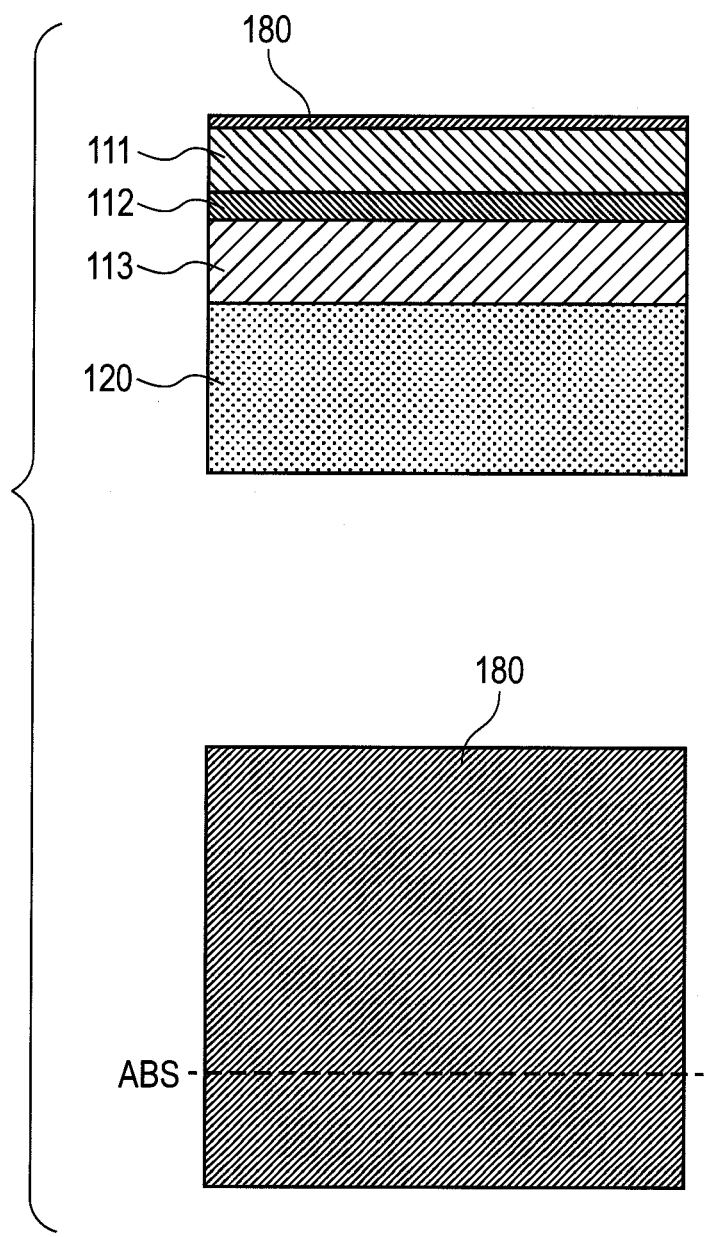
FIG. 7A is a schematic sectional view illustrating a production process of an oscillator according to a third embodiment.

Firstly, the pinned layer 113, the intermediate layer 112, and the FGL 111 forming the oscillator 110 are sequentially formed on the main pole 120 by using a thin-film formation technique such as a sputtering as illustrated in FIG. 7A. The FGL 111, the intermediate layer 112, and the pinned layer 113 may be formed in this order from the main pole 120. The materials and thickness of the pinned layer 113, the intermediate layer 112, and the FGL 111 are the same described in the first embodiment. An overcoat 180 such as DLC (diamond-like carbon) is preferably formed on the uppermost surface in order to prevent damage on the oscillator 110 caused by the subsequent process.

Figure 7B:
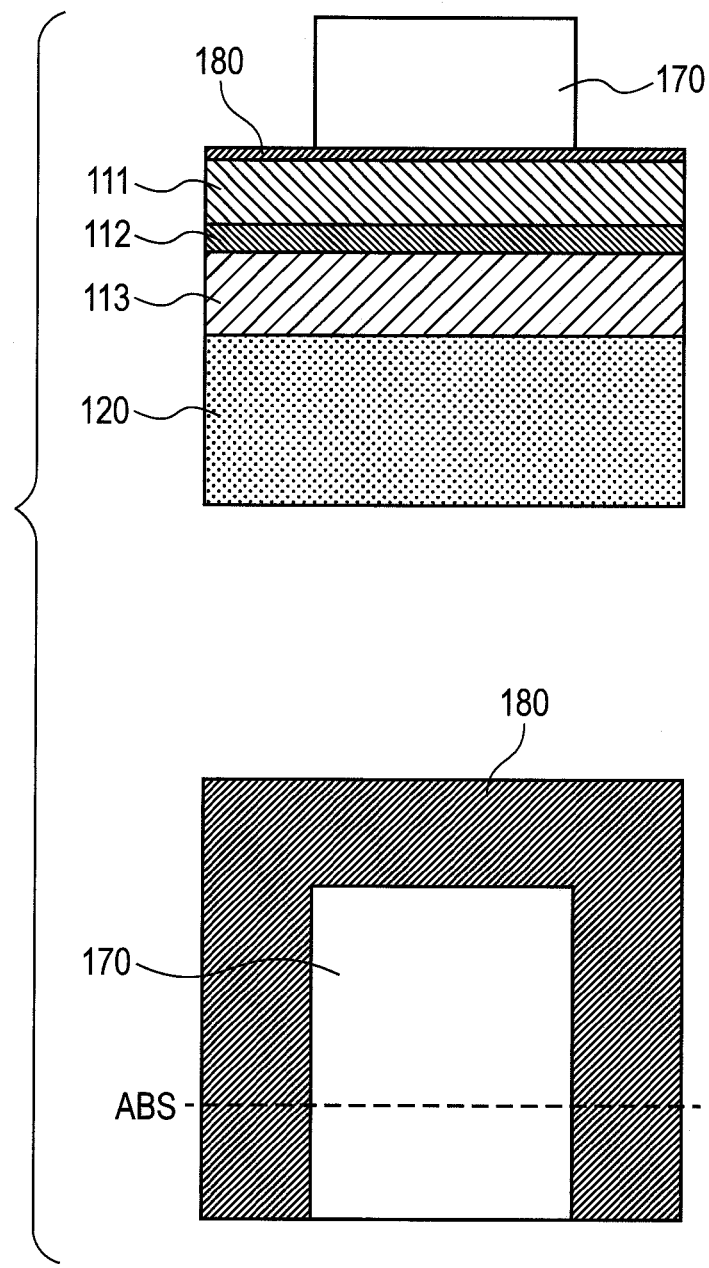
FIG. 7B is a schematic sectional view illustrating the production process of the oscillator according to the third embodiment.
Figure 7C:
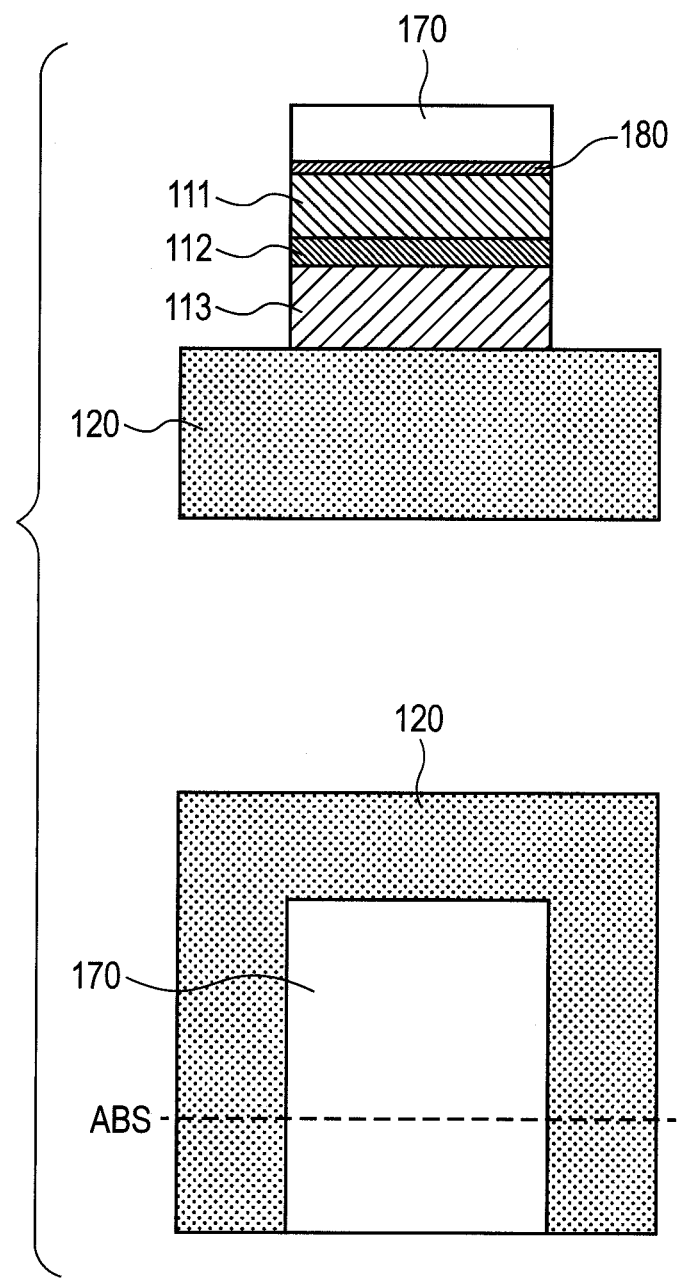
FIG. 7C is a schematic sectional view illustrating the production process of the oscillator according to the third embodiment.

Then, as illustrated in FIG. 7B, a resist 170 having a predetermined shape is formed by the photolithography, for example. Then, the stacked layers exposed from the resist 170 are etched by ion-milling process, for example, as illustrated in FIG. 7C.

Figure 7D:
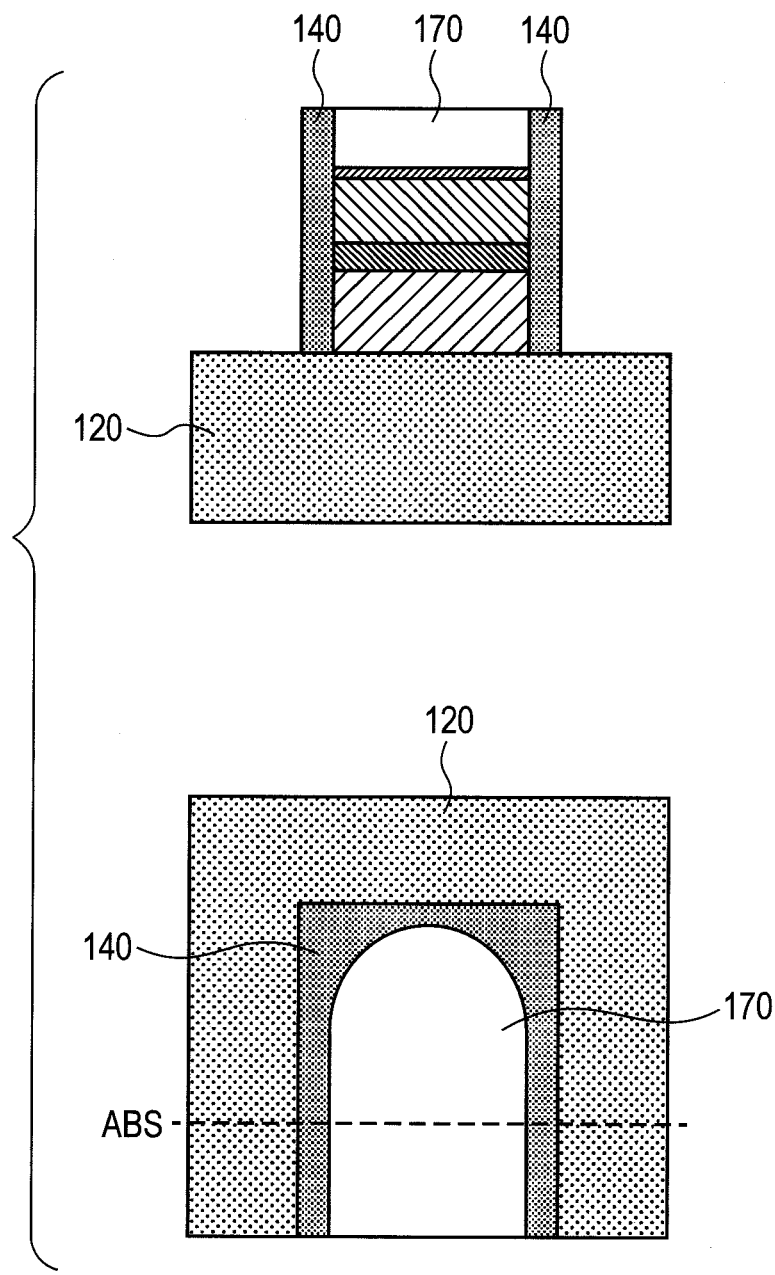
FIG. 7D is a schematic sectional view illustrating the production process of the oscillator according to the third embodiment.

As illustrated in FIG. 7D, the oxidation, which is the feature of the present invention, is performed on the side face of the oscillator 110. In the present embodiment, the ozone oxidation is performed. Specifically, the ozone oxidation is carried out at 170° C. under oxygen gas atmosphere with ozone concentration of 5%. Thus, oxygen under the ozone atmosphere is coupled to an element M (M is Co, Ni, Fe, Cu, for example) forming the oscillator 110 on the side face of the oscillator, whereby an oxide MOx (x is an indefinite numeral) of the element is formed. Under the condition in the present embodiment, the oxide layer 140 with a thickness of 5 nm is formed on the side face of the oscillator 110. The thickness of the oxide layer to be formed can be adjusted to be not more than 5 nm or not less than 5 nm by the heating temperature.

A plasma oxidation may be carried out instead of the ozone oxidation. The plasma oxidation is carried out by using oxygen gas, wherein the flow rate of the oxygen gas is set as 50 cm²/min, a pressure in a chamber is set as 133 Pa, and a heating temperature is set as 200° C., for example. In the plasma oxidation, oxygen under plasma atmosphere is coupled to the element (e.g., Co, Ni, Fe, Cu) forming the oscillator, whereby the oxide layer with the thickness of 5 nm is formed on the side face of the oscillator. As in the ozone oxidation described above, the thickness of the oxide layer can be adjusted by the heating temperature. By performing the oxidation such as the ozone oxidation or plasma oxidation after the etching of the stacked layers as described above, the oxide layer that is rounded at the corner of the oscillator can be formed.

Figure 7E:
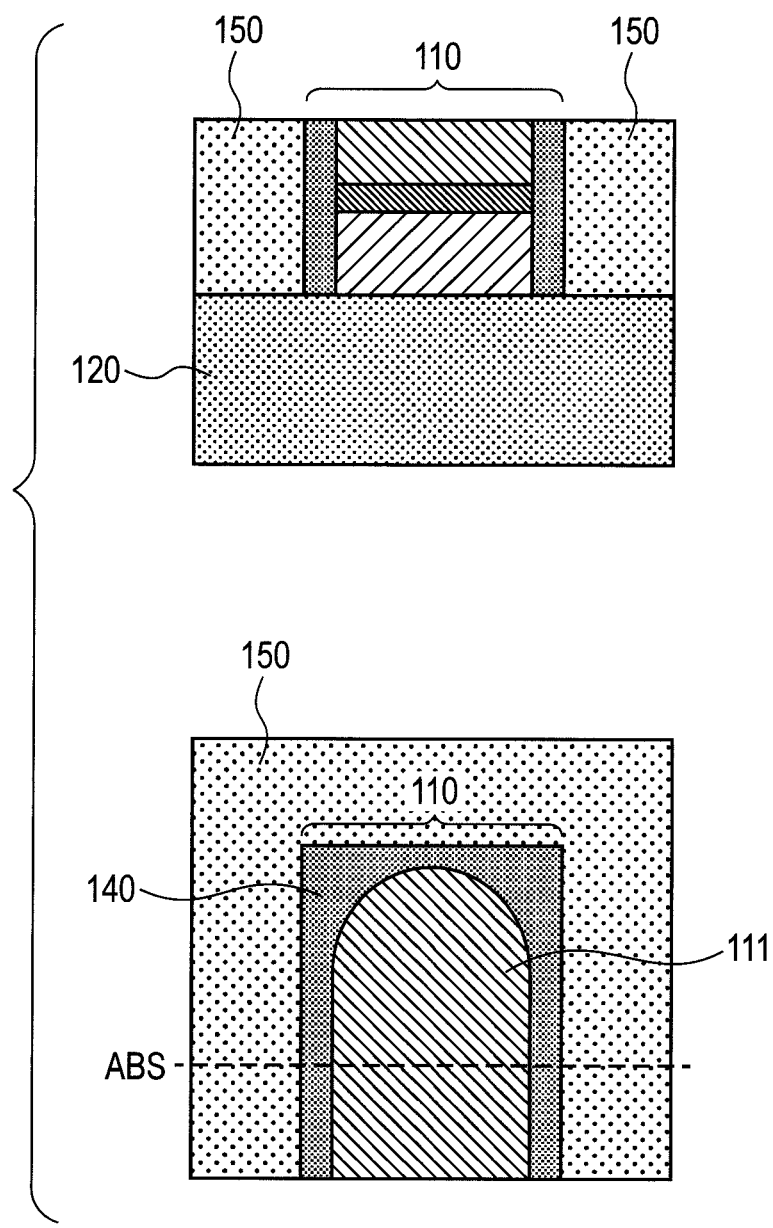
FIG. 7E is a schematic sectional view illustrating the production process of the oscillator according to the third embodiment.

Thereafter, the refill insulation layer 150 such as alumina is buried and formed as illustrated in FIG. 7E, the resist 170 is removed by a lift-off process, and the overcoat 180 is removed by an ashing process, for example. Thus, magnetic head having the oxide layer 140 formed on the side face of the oscillator 110 can be produced.

Fourth Embodiment

Another example of a method for producing the oscillator 110 on the recording section will be described with reference to process drawings in FIGS. 8A to 8E. Different from the third embodiment, the present embodiment describes the case where the shape of the oscillator 110 becomes semi-circular due to the formation of a nitride layer 190. In FIGS. 8A to 8E, the upper one is a schematic view of a cross-section perpendicular to a top surface of a substrate, as the oscillator 110 is viewed from the air bearing surface during the production process of the magnetic head, while the lower one is a schematic view, as the oscillator 110 is viewed from the trailing direction with the air bearing surface facing downward. ABS in these figures indicates a final position of the air bearing surface of the head. The portion near the substrate from the main pole 120 is not illustrated in FIGS. 8A to 8E.

Figure 8A:
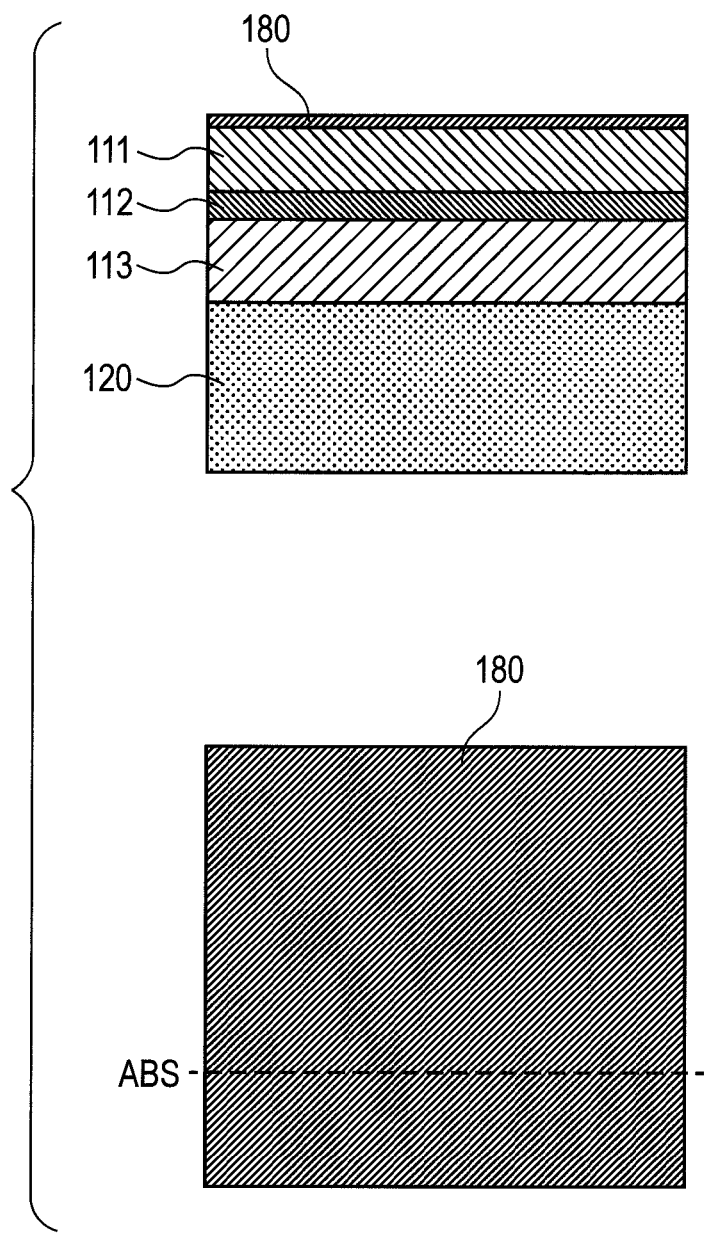
FIG. 8A is a schematic sectional view illustrating a production process of an oscillator according to a fourth embodiment.

Firstly, the pinned layer 113, the intermediate layer 112, and the FGL 111 forming the oscillator 110 are sequentially formed on the main pole 120 by using a thin-film formation technique such as a sputtering as illustrated in FIG. 8A. The FGL 111, the intermediate layer 112, and the pinned layer 113 may be formed in this order from the main pole 120. The materials and thickness of the pinned layer 113, the intermediate layer 112, and the FGL 111 are the same as described in the first embodiment. The overcoat 180 such as DLC (diamond-like carbon) is preferably formed on the uppermost surface in order to prevent damage on the oscillator 110 caused by the subsequent process.

Figure 8B:
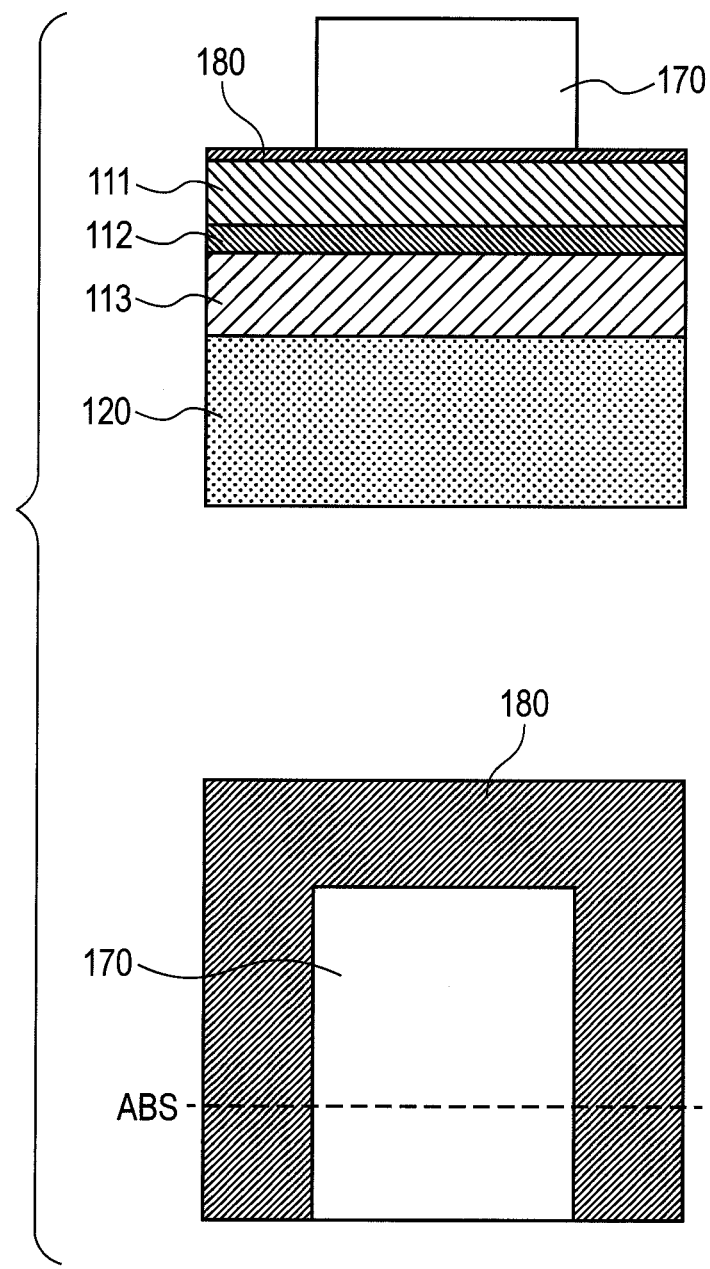
FIG. 8B is a schematic sectional view illustrating the production process of the oscillator according to the fourth embodiment.

Then, as illustrated in FIG. 8B, the resist 170 having a predetermined shape is formed by the photolithography, for example. Then, the stacked layers exposed from the resist 170 are etched by ion-milling process, for example, as illustrated in FIG. 8C.

Figure 8D:
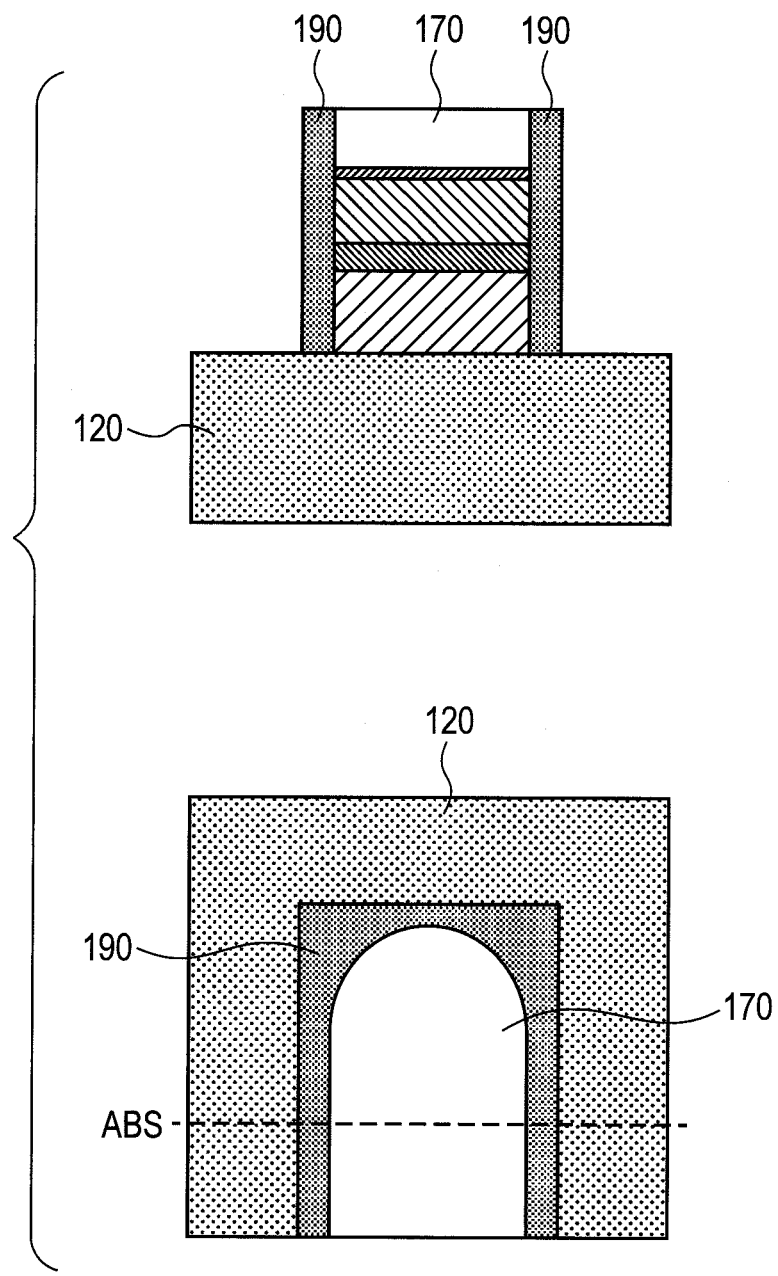
FIG. 8D is a schematic sectional view illustrating the production process of the oscillator according to the fourth embodiment.

As illustrated in FIG. 8D, the nitridation, which is the feature of the present invention, is performed on the side face of the oscillator 110. In the present embodiment, the plasma nitridation is performed. Specifically, the plasma nitridation is carried out by using gas mixture of nitrogen and hydrogen, wherein the flow rate of the gas mixture is set as 100 cm²/min, a pressure in a chamber is set as 133 Pa, and a heating temperature is set as 200° C., for example. In the plasma nitridation, nitrogen under plasma atmosphere is coupled to the element M (e.g., M is Co, Ni, Fe, or Cu) forming the oscillator 110 on the side face of the oscillator, whereby a nitride MNy (y is an indefinite numeral) of the element is formed. Under the condition in the present embodiment, the nitride layer 190 with a thickness of 5 nm is formed on the side face of the oscillator 110. The thickness of the nitride layer to be formed can be adjusted to be not more than 5 nm or not less than 5 nm by the heating temperature. By performing the nitridation after the etching of the stacked layers as described above, the nitride layer that is rounded at the corner of the oscillator can be formed.

Thereafter, the refill insulation layer 150 such as alumina is buried and formed as illustrated in FIG. 8E, the resist 170 is removed by a lift-off process, and the overcoat 180 is removed by an ashing process, for example. Thus, magnetic head having the nitride layer 190 formed on the side face of the oscillator 110 can be produced.

When the oxidation described in the third embodiment and the nitridation described in the present embodiment are both carried out, an oxynitride layer can be formed, instead of the oxide layer 140 and the nitride layer 190.

Fifth Embodiment

Another example of a method for producing the oscillator 110 on the recording section will be described with reference to process drawings in FIGS. 9A to 9J. Different from the third embodiment and the fourth embodiment, the present embodiment describes the case in which the shape of the oscillator 110 is not formed to be semi-circular. Specifically, the pattern formation in the track width direction and the pattern formation in the element height direction are separately carried out in the present embodiment. In the present embodiment, the oscillator is formed in the track width direction, and then, in the element height direction. However, the order of the formation may be reversed. Specifically, the oscillator may be formed in the element height direction, and then, in the track width direction. In FIGS. 9A to 9J, the upper one is a schematic view of a cross-section perpendicular to a top surface of a substrate, as the oscillator 110 is viewed from the air bearing surface during the production process of the magnetic head, while the lower one is a schematic view, as the oscillator 110 is viewed from the trailing direction with the air bearing surface facing downward. ABS in these figures indicates a final position of the air bearing surface of the head. The portion near the substrate from the main pole 120 is not illustrated in FIGS. 9A to 9J.

Firstly, the pinned layer 113, the intermediate layer 112, and the FGL 111 forming the oscillator 110 are sequentially formed on the main pole 120 by using a thin-film formation technique such as a sputtering as illustrated in FIG. 8A. The FGL 111, the intermediate layer 112, and the pinned layer 113 may be formed in this order from the main pole 120. The materials and thickness of the pinned layer 113, the intermediate layer 112, and the FGL 111 are the same as described in the first embodiment. The overcoat 180 such as DLC (diamond-like carbon) is preferably formed on the uppermost surface in order to prevent damage on the oscillator 110 caused by the subsequent process.

Figure 9A:
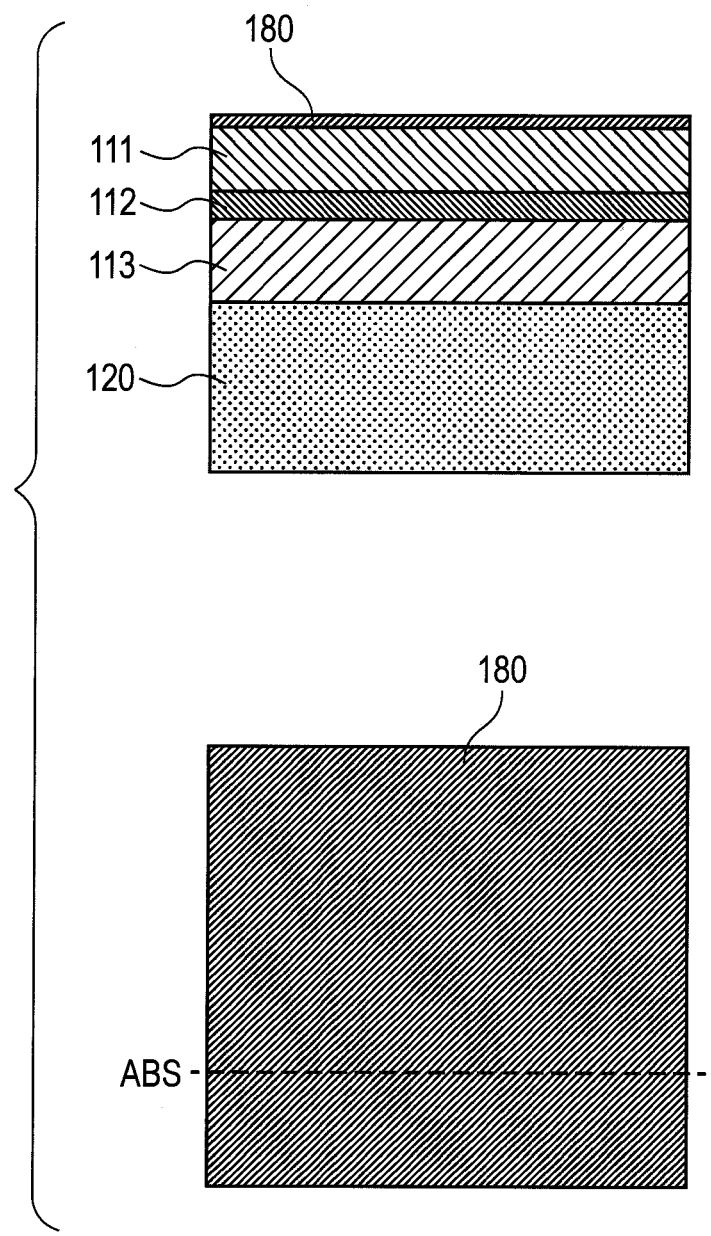
FIG. 9A is a schematic sectional view illustrating a production process of an oscillator according to a fifth embodiment.
Figure 9B:
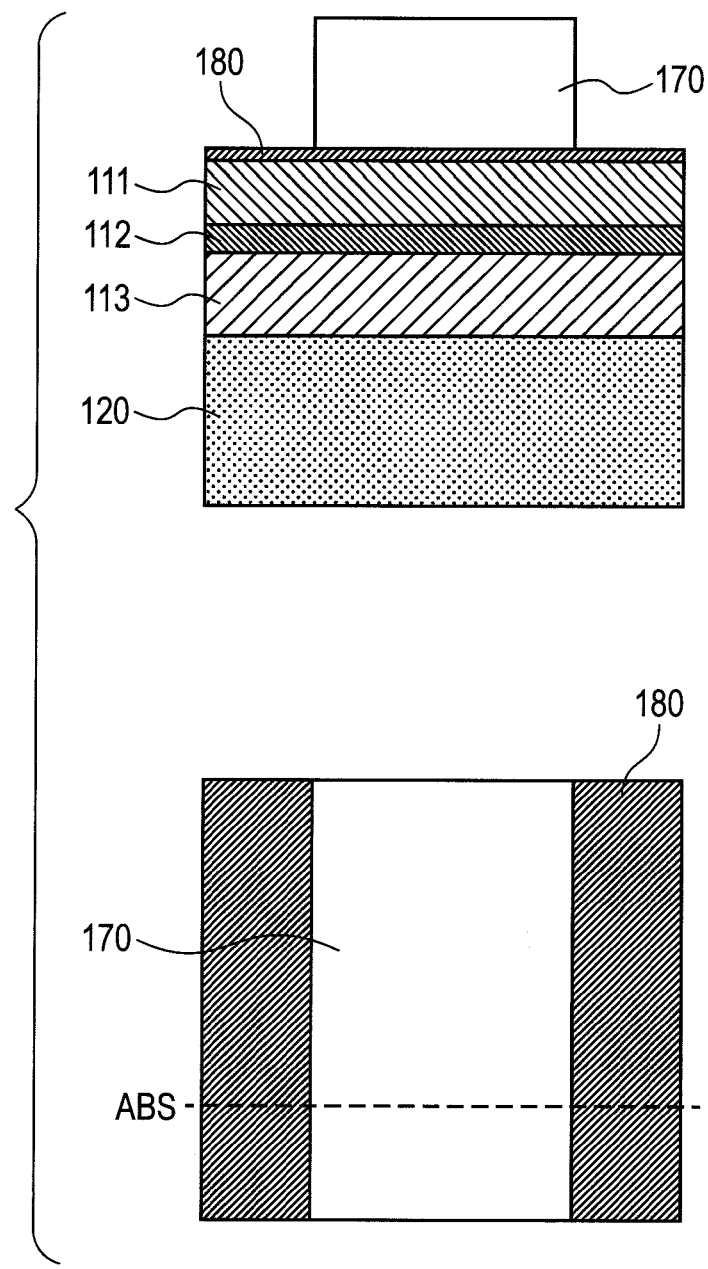
FIG. 9B is a schematic sectional view illustrating the production process of the oscillator according to the fifth embodiment.
Figure 9C:
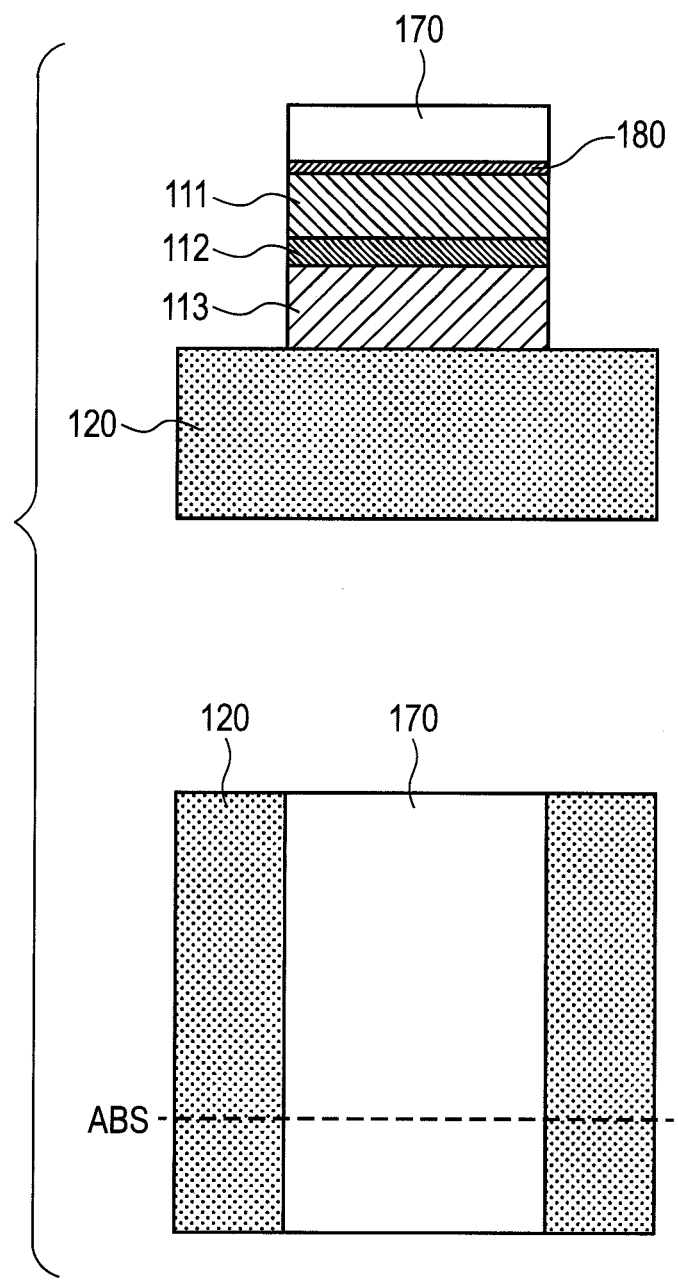
FIG. 9C is a schematic sectional view illustrating the production process of the oscillator according to the fifth embodiment.

Then, as illustrated in FIG. 9B, the resist 170 having a predetermined shape is formed by the photolithography, for example. In this case, only the width of the resist 170 in the track width direction is set to be equal to the desired Two, and the width in the element height direction may be set longer than the desired SHo, compared to the third embodiment. Then, the stacked layers exposed from the resist 170 are etched by ion-milling process, for example, as illustrated in FIG. 9C.

Figure 9D:
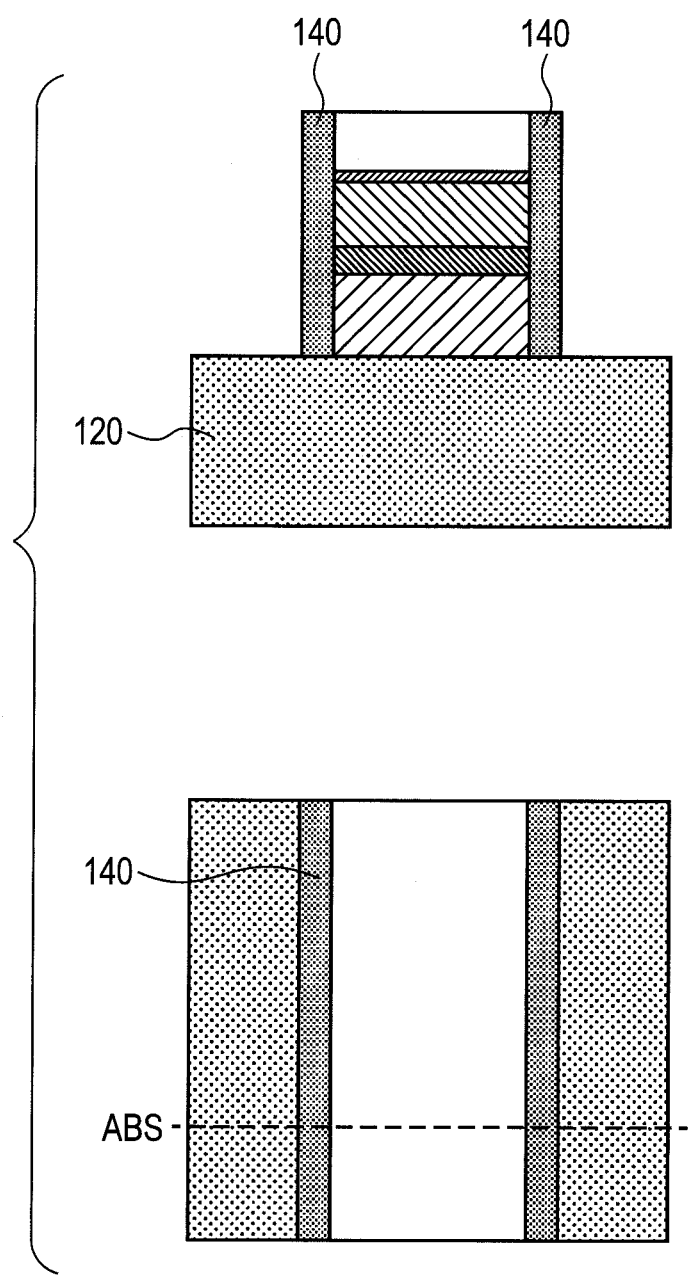
FIG. 9D is a schematic sectional view illustrating the production process of the oscillator according to the fifth embodiment.

As illustrated in FIG. 9D, the oxidation, which is the feature of the present invention, is performed on the side face of the oscillator 110. By virtue of the oxidation, the width of the oscillator in the track width direction can be decreased. The ozone oxidation may be carried out as in the third embodiment, or the plasma oxidation may be carried out. In the present embodiment, the oxide layer 140 with a thickness of 5 nm is formed on the side face of the oscillator 110. The thickness of the oxide layer 140 can be adjusted by the heating temperature. Instead of the oxide layer, the nitride layer or oxynitride layer may be formed.

Figure 9E:
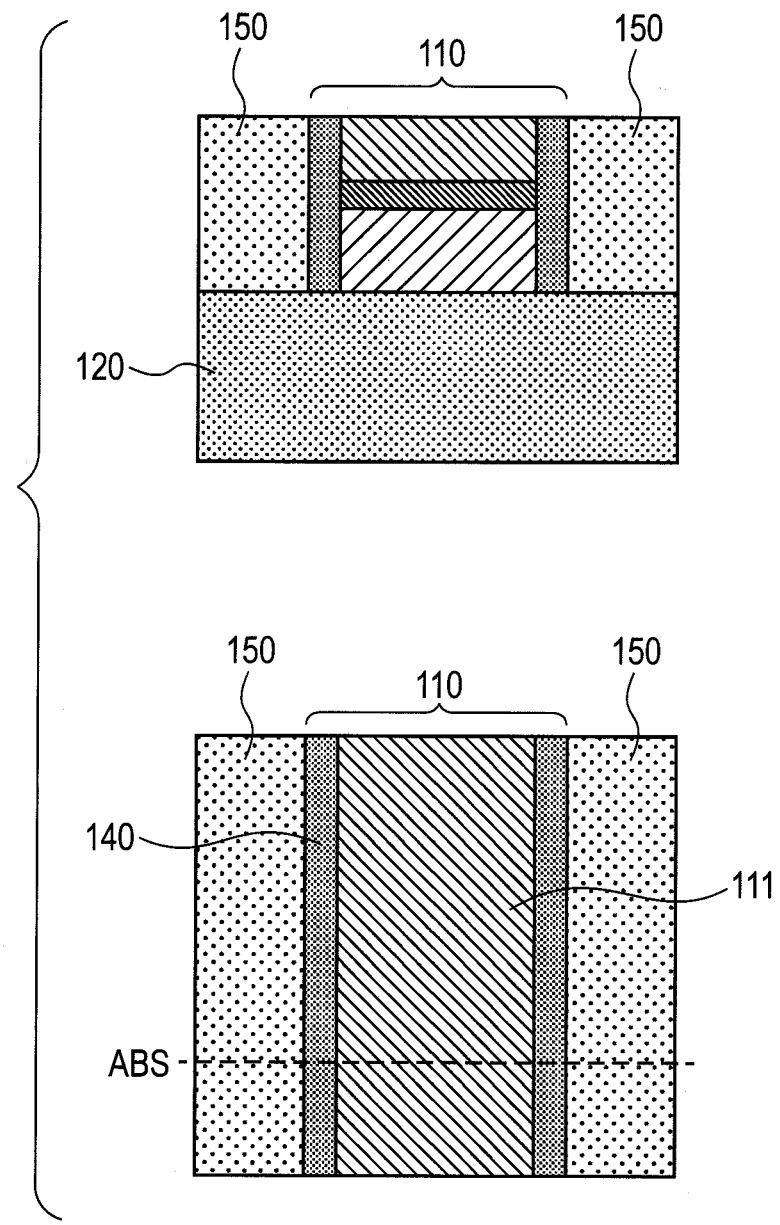
FIG. 9E is a schematic sectional view illustrating the production process of the oscillator according to the fifth embodiment.

Thereafter, the refill insulation layer 150 such as alumina is buried and formed as illustrated in FIG. 9E, the resist 170 is removed by a lift-off process, and the overcoat 180 is removed by an ashing process, for example.

Figure 9F:
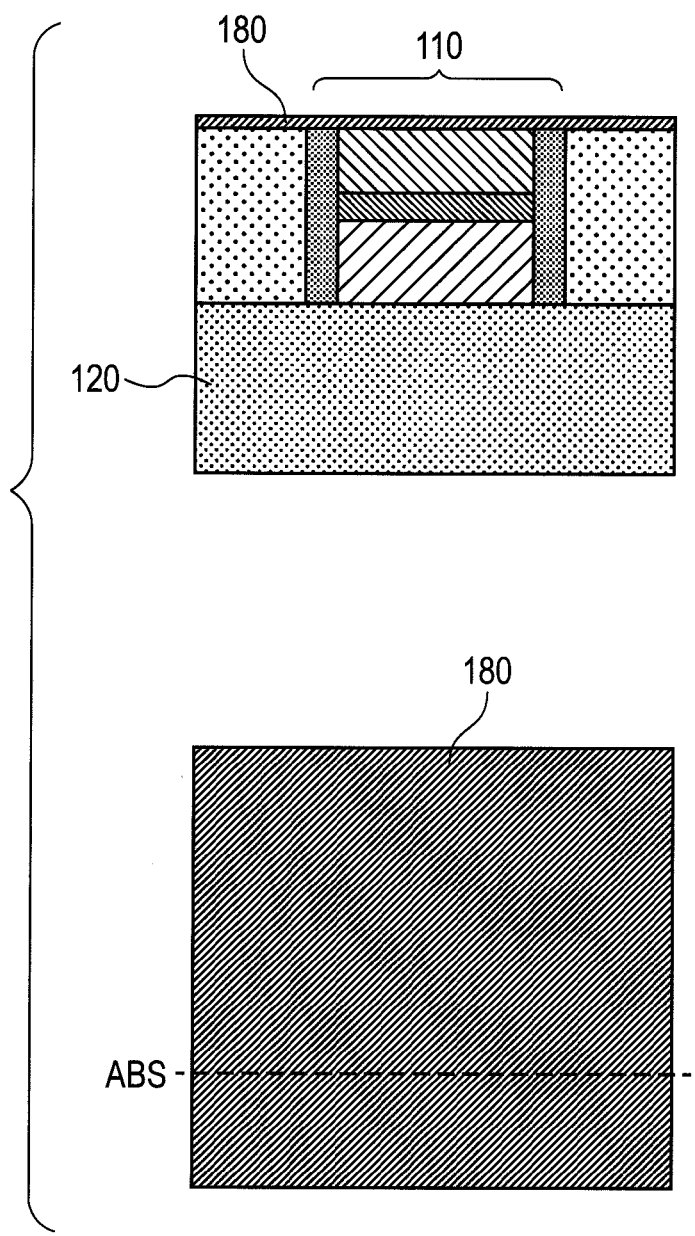
FIG. 9F is a schematic sectional view illustrating the production process of the oscillator according to the fifth embodiment.
Figure 9G:
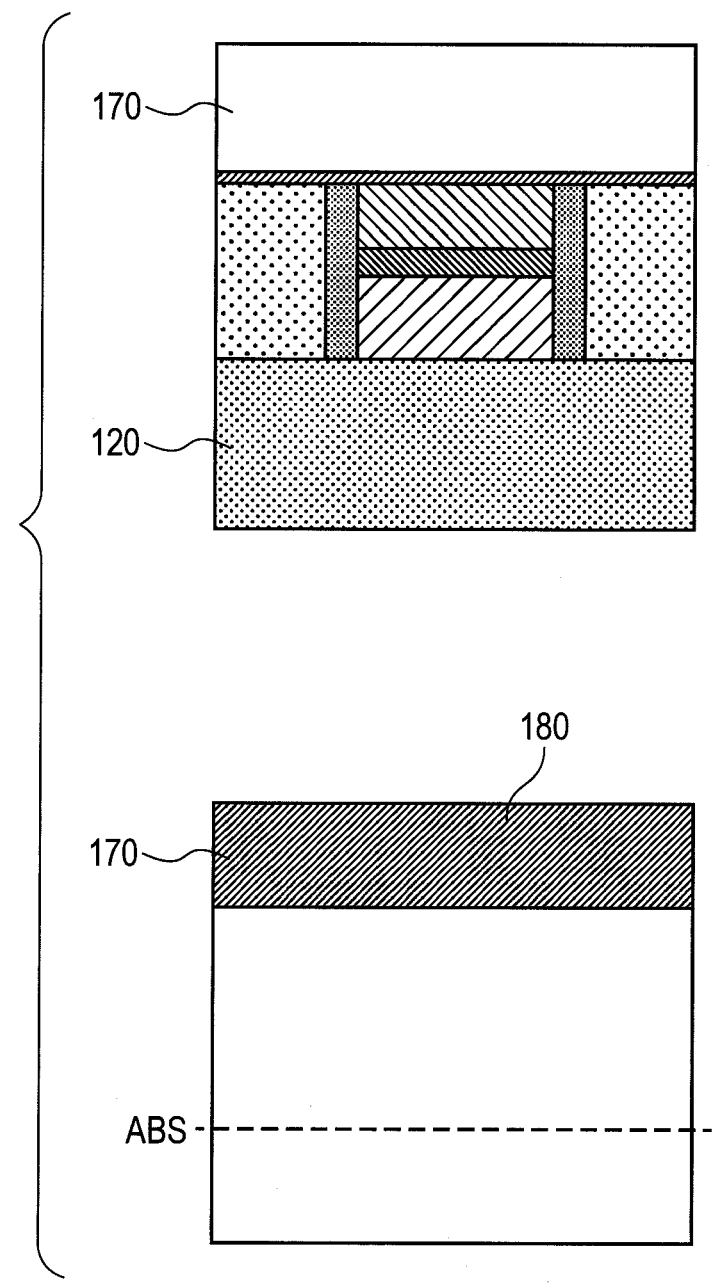
FIG. 9G is a schematic sectional view illustrating the production process of the oscillator according to the fifth embodiment.
Figure 9H:
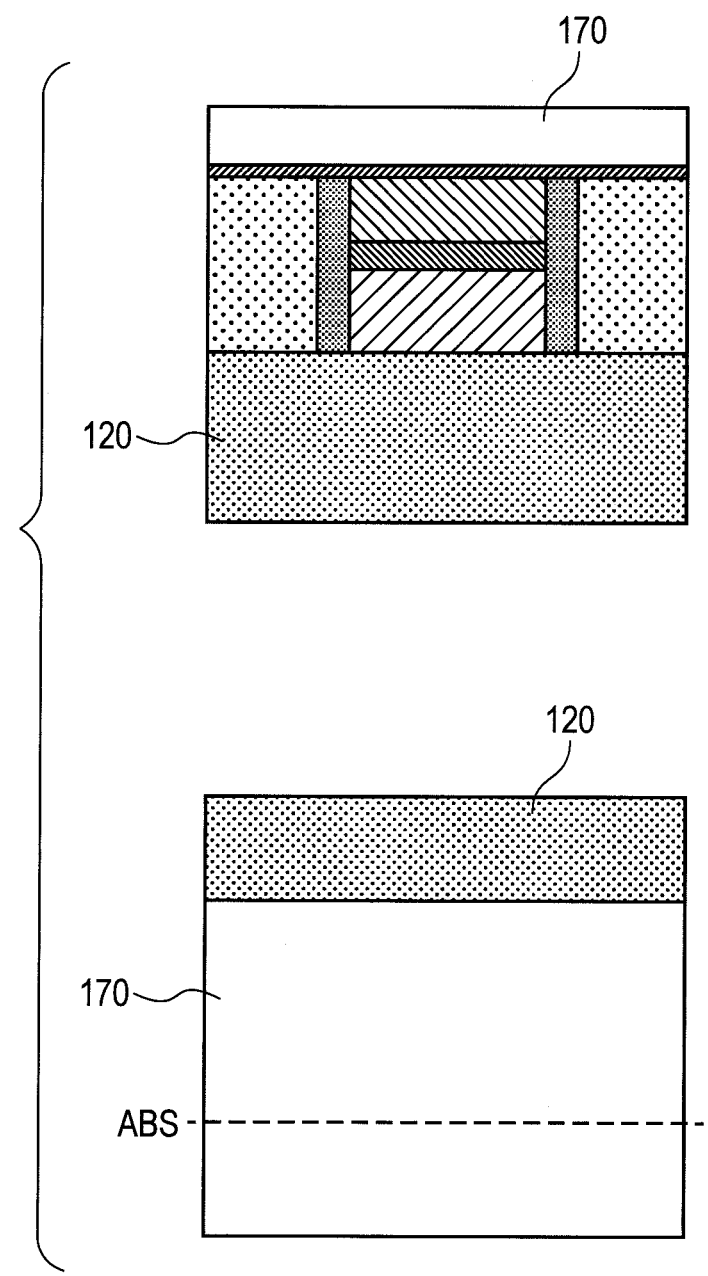
FIG. 9H is a schematic sectional view illustrating the production process of the oscillator according to the fifth embodiment.

Then, the overcoat 180 such as DLC is again formed on the uppermost surface in order to carry out the pattern formation in the element height direction as illustrated in FIG. 9F, and then, the resist 170 having a predetermined shape is formed by, for example, photolithography as illustrated in FIG. 9G. In this case, the resist 170 is formed to have the width in the element height direction equal to the desired SHo. The width in the track width direction may be formed to be wider than the width set in FIG. 9B. Then, as illustrated in FIG. 9H, the stacked layers exposed from the resist 170 are etched by ion-milling process, for example.

Figure 9I:
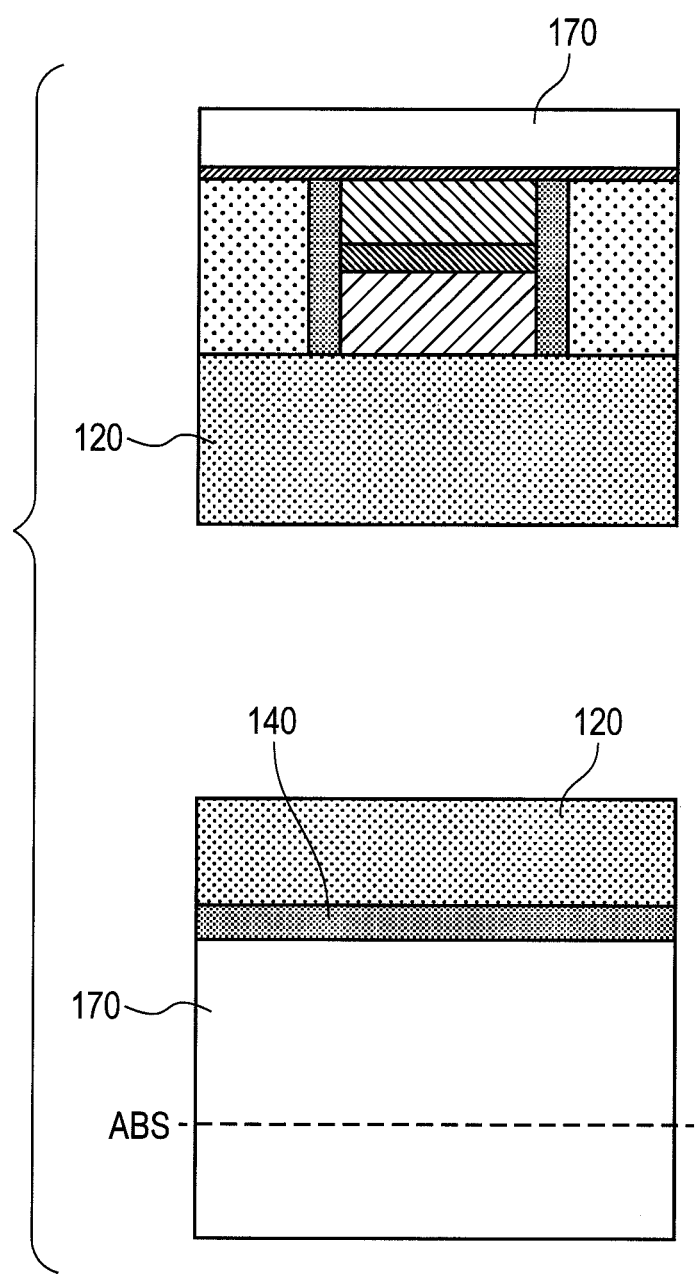
FIG. 9I is a schematic sectional view illustrating the production process of the oscillator according to the fifth embodiment.

As illustrated in FIG. 9I, the side face of the oscillator 110 in the element height direction undergoes the oxidation. In the case of the pattern formation in the element height direction, the oxidation is not necessarily required. The oxidation may be the ozone oxidation as in FIG. 9D, or the plasma oxidation. Instead of the oxidation, the nitridation or oxynitridation may be carried out. In the present embodiment, the oxide layer 140 with a thickness of 5 nm is formed on the side face of the oscillator in the element height direction by the oxidation.

In this case, different from the third embodiment, the shape of the oscillator 110 is not semi-circular from the air bearing surface toward the element height direction, but can be rectangle. This is based upon the reason described below. Specifically, the oxidation reaction generally depends upon the concentration of oxygen supplied under constant temperature. However, in the case where the side face of the oscillator that is to be exposed to oxygen is limited to the side face in the element height direction as in the present embodiment, oxygen is uniformly supplied to the oscillator, so that the oxidation reaction progresses uniformly on the side face of the oscillator. In the third embodiment, not only the side face of the oscillator in the element height direction but also the side face in the track width direction are exposed to oxygen. Therefore, the concentration of oxygen to be supplied becomes relatively higher on the corner of the oscillator where both side faces cross each other than the other portions, with the result that the oxidation reaction is accelerated on the corner of the oscillator. Accordingly, the rounded oxide layer is formed.

Figure 9J:
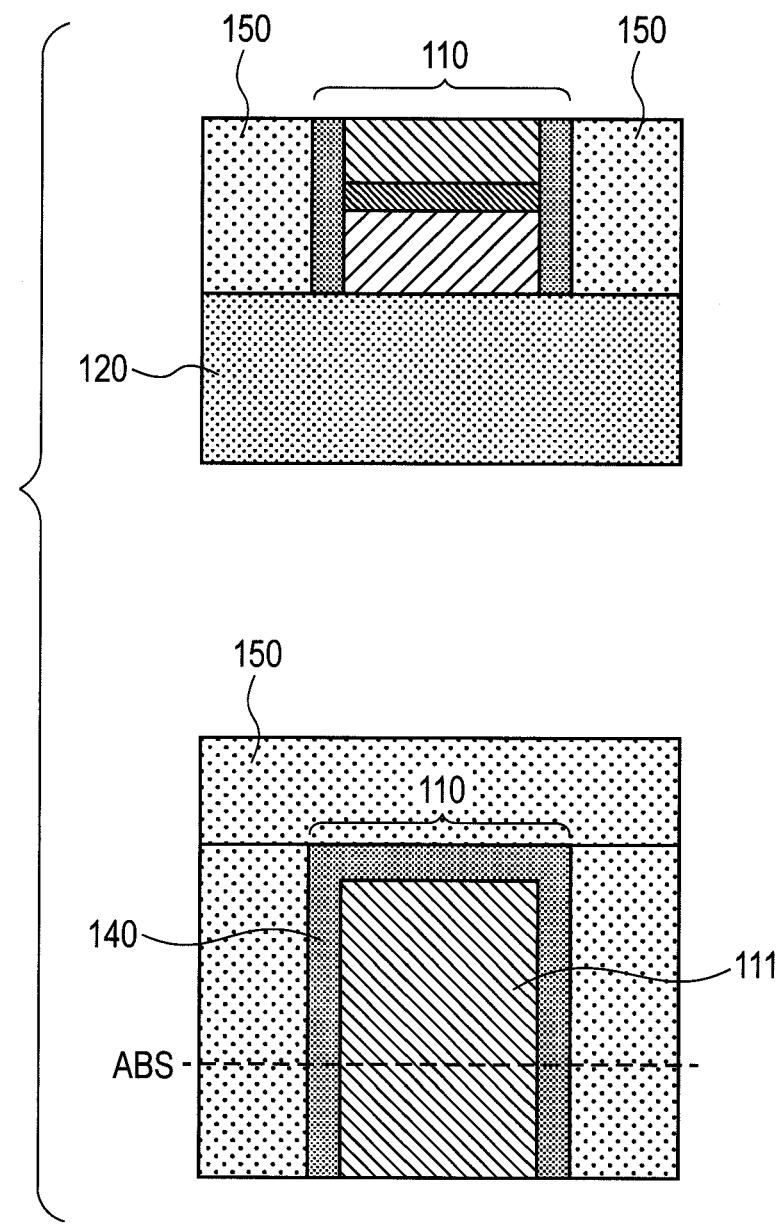
FIG. 9J is a schematic sectional view illustrating the production process of the oscillator according to the fifth embodiment.

Thereafter, the refill insulation layer 150 such as alumina is buried and formed as illustrated in FIG. 9J, the resist 170 is removed by a lift-off process, and the overcoat 180 is removed by an ashing process, for example. Thus, a magnetic head having the oxide layer 140 formed on the side face of the oscillator 110 can be produced.

Sixth Embodiment

Another example of a method for producing the oscillator 110 on the recording section will be described with reference to process drawings in FIGS. 10A to 10E. The present embodiment describes the case in which the oxide layer, the nitride layer, or the oxynitride layer is formed only on one side face of the oscillator. Even if the oxide layer, the nitride layer, or the oxynitride layer is formed only on one side face in the track width direction of the oscillator, the width of the oscillator in the track width direction can be decreased, which is the object of the present invention. In FIGS. 10A to 10E, the upper one is a schematic view of a cross-section perpendicular to a top surface of a substrate, as the oscillator 110 is viewed from the air bearing surface during the production process of the magnetic head, while the lower one is a schematic view, as the oscillator 110 is viewed from the trailing direction with the air bearing surface facing downward. ABS in these figures indicates a final position of the air bearing surface of the head. The portion near the substrate from the main pole 120 is not illustrated in FIGS. 10A to 10E.

Figure 10A:
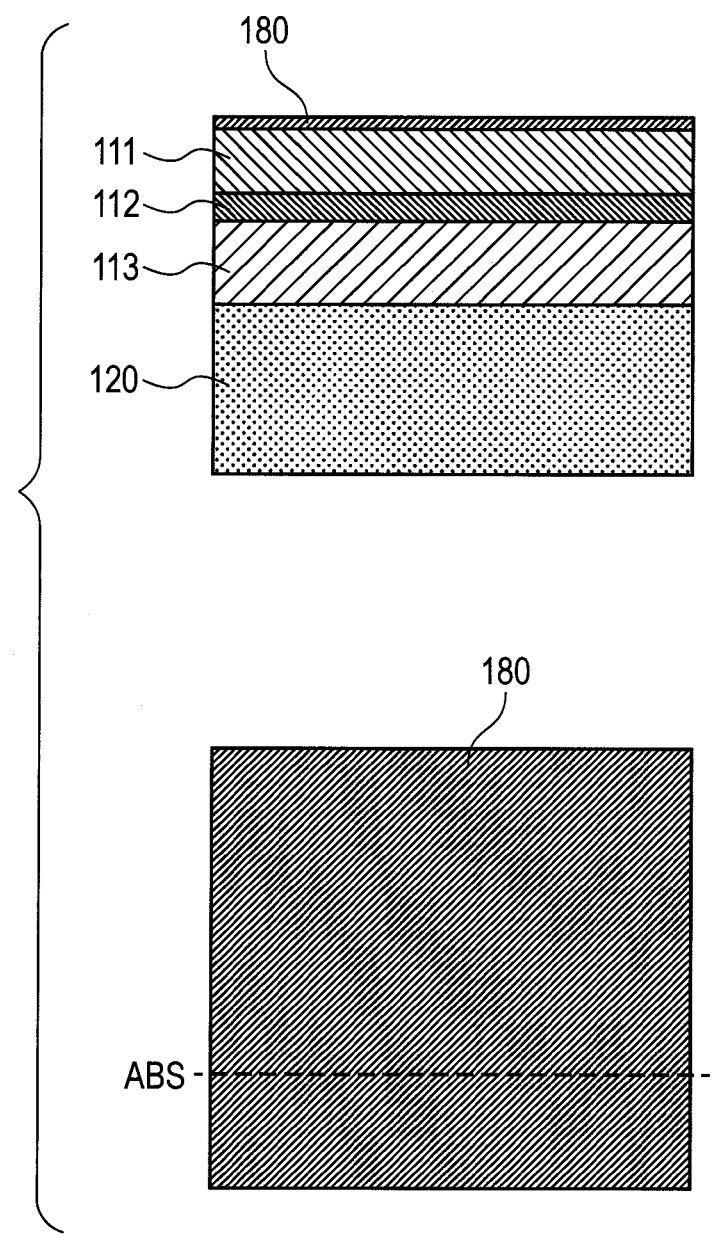
FIG. 10A is a schematic sectional view illustrating a production process of an oscillator according to a sixth embodiment.

Firstly, the pinned layer 113, the intermediate layer 112, and the FGL 111 forming the oscillator 110 are sequentially formed on the main pole 120 by using a thin-film formation technique such as a sputtering as illustrated in FIG. 10A. The FGL 111, the intermediate layer 112, and the pinned layer 113 may be formed in this order from the main pole 120. The materials and thickness of the pinned layer 113, the intermediate layer 112, and the FGL 111 are the same as described in the first embodiment. The overcoat 180 such as DLC (diamond-like carbon) is preferably formed on the uppermost surface in order to prevent damage on the oscillator 110 caused by the subsequent process.

Figure 10B:
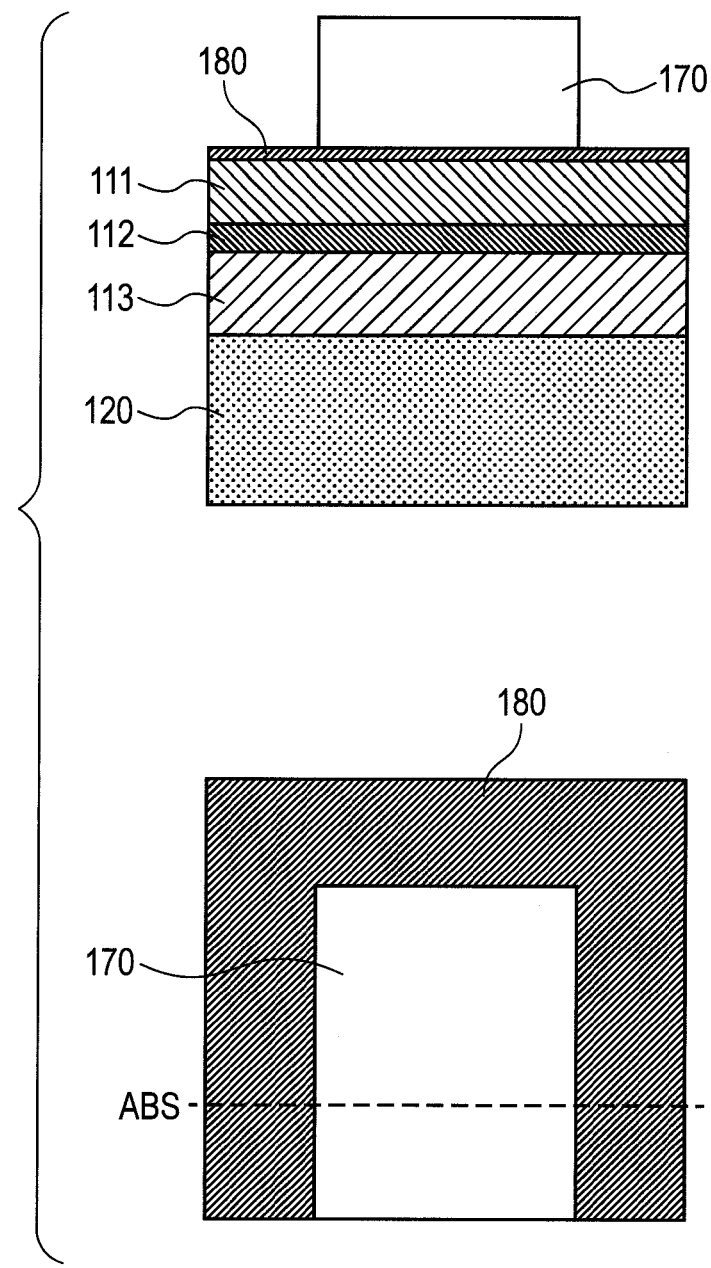
FIG. 10B is a schematic sectional view illustrating the production process of the oscillator according to the sixth embodiment.
Figure 10C:
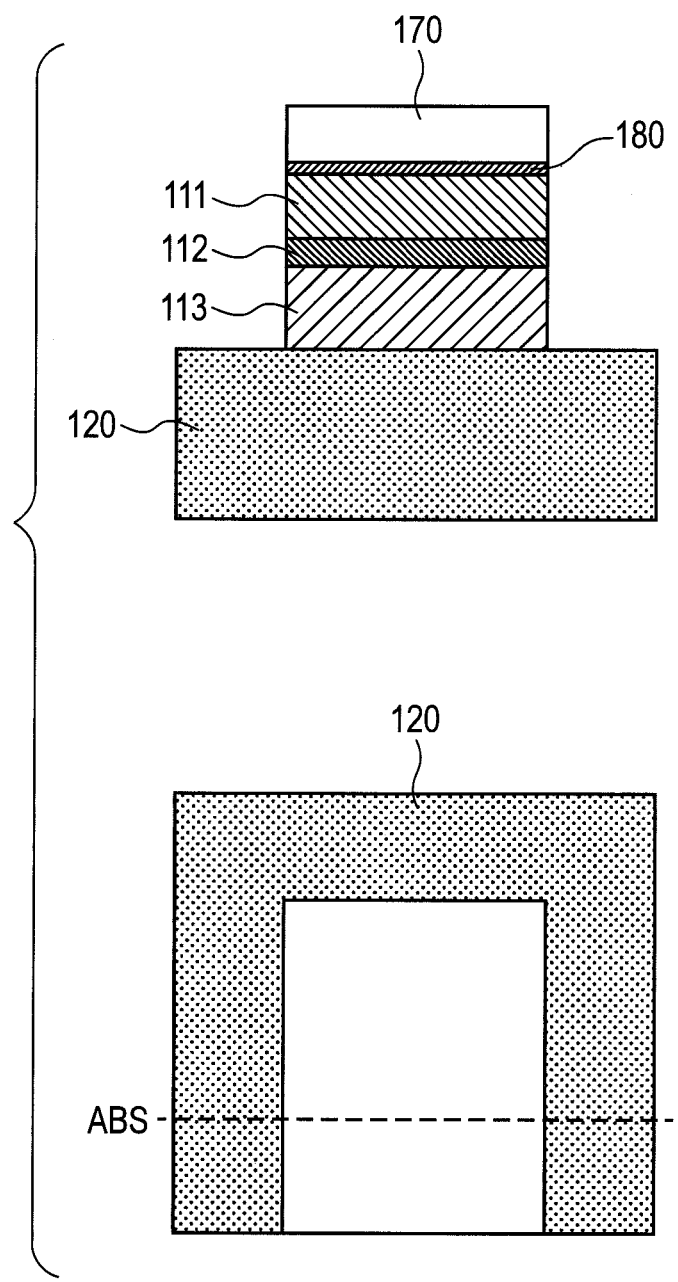
FIG. 10C is a schematic sectional view illustrating the production process of the oscillator according to the sixth embodiment.

Then, as illustrated in FIG. 10B, the resist 170 having a predetermined shape is formed by the photolithography, for example. Then, the stacked layers exposed from the resist 170 are etched by ion-milling process, for example, as illustrated in FIG. 10C.

Figure 10D:
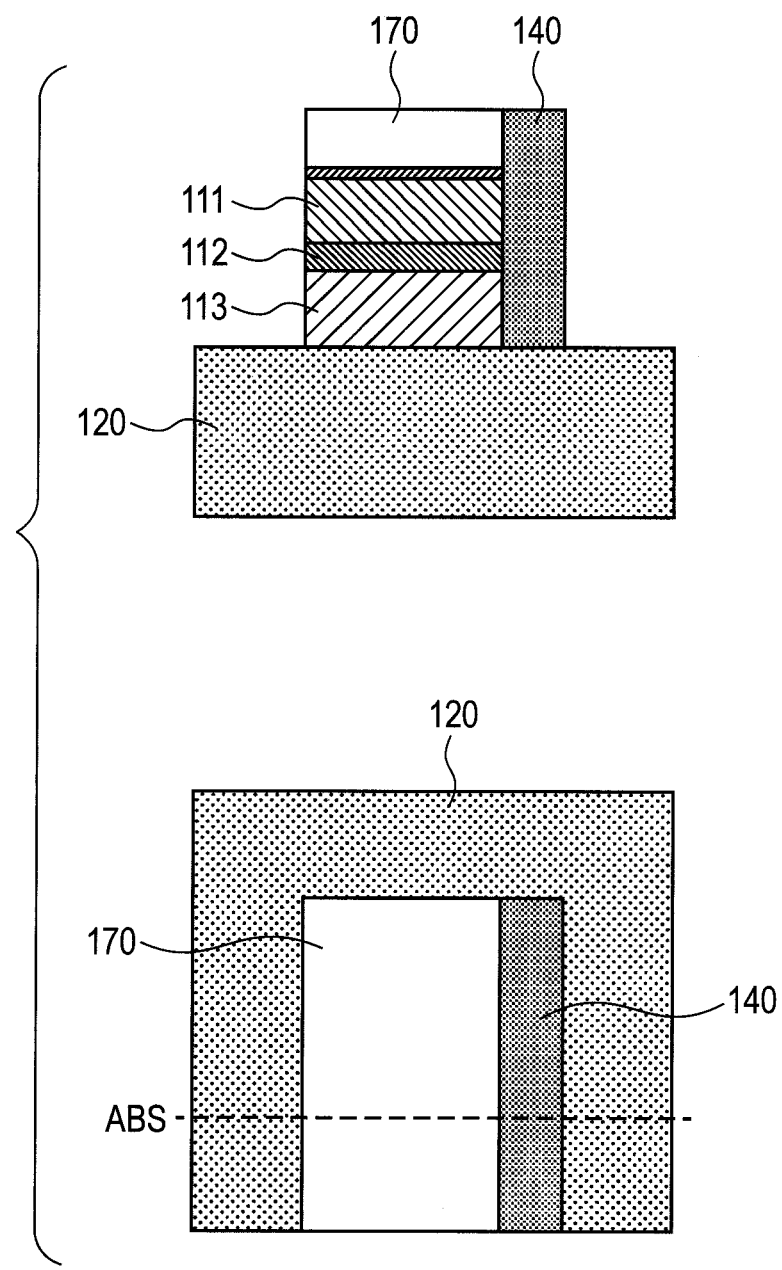
FIG. 10D is a schematic sectional view illustrating the production process of the oscillator according to the sixth embodiment.

As illustrated in FIG. 10D, the oxidation, which is the feature of the present invention, is performed on the side face of the oscillator 110. In the present embodiment, the oxide layer can be formed on only one side face by ion implantation. The ion implantation is performed such that an oxygen ion of 20 keV is implanted from one side face of the element at an angle of about 45 degrees with respect to the surface of the layer, whereby this face is oxidized. The amount of implanted oxygen ion is $1 \times 10^{15}$ ions/cm$^2$. According to this process, oxygen is doped on one side face of the element due to the directivity of ion beam. The heat treatment is then performed, whereby the oxide layer can be formed.

The nitride layer can be formed by using a nitrogen ion, or the oxynitride layer can be formed by using both oxygen ion and nitrogen ion. Under the condition in the present embodiment, the oxide layer 140 with a thickness of 10 nm is formed on one side of the oscillator 110. As in the third embodiment, or the fourth and fifth embodiments, the oxide layer, the nitride layer, or the oxynitride layer can be formed on both side faces in the track width direction, or on the side face in the element height direction.

Figure 10E:
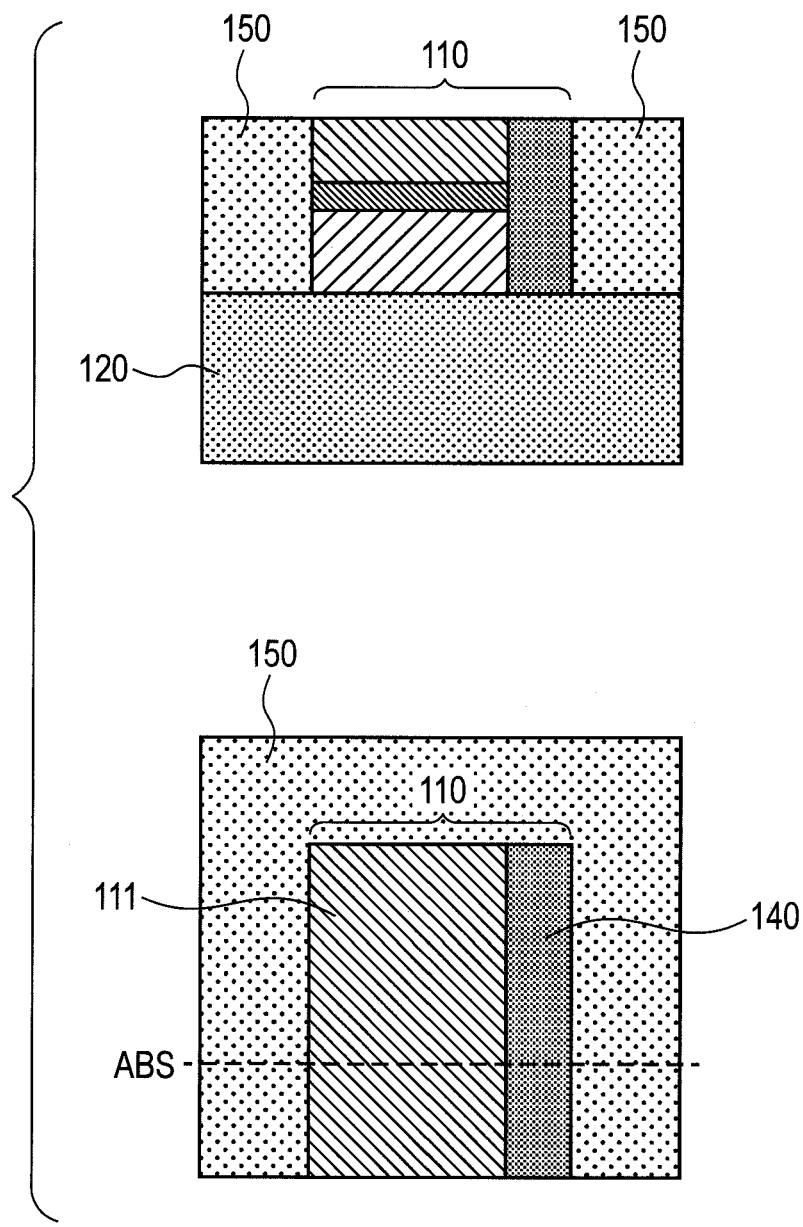
FIG. 10E is a schematic sectional view illustrating the production process of the oscillator according to the sixth embodiment.

Thereafter, the refill insulation layer 150 such as alumina is buried and formed as illustrated in FIG. 10E, the resist 170 is removed by a lift-off process, and the overcoat 180 is removed by an ashing process, for example. Thus, a magnetic head having the oxide layer 140, the nitride layer, or the oxynitride layer formed on the side face of the oscillator 110 can be produced.

Seventh Embodiment

Figure 11:
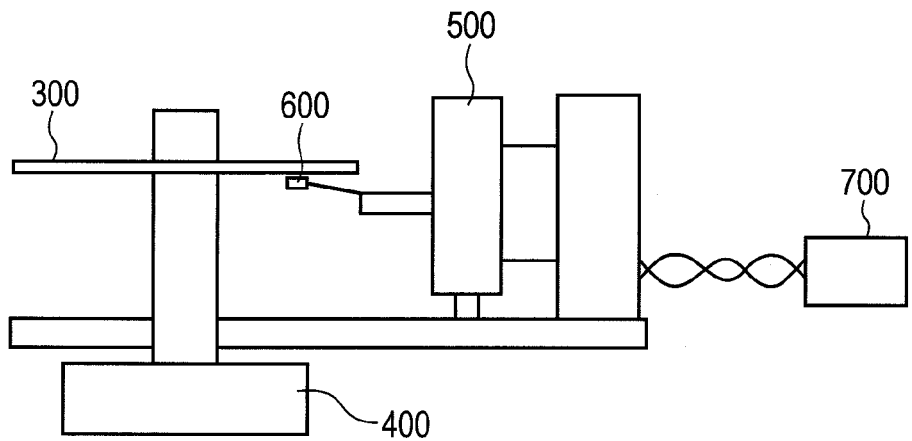
FIG. 11 is a schematic view illustrating a configuration of a magnetic recording/reproducing apparatus.

FIG. 11 is a schematic view illustrating an example of a configuration of a magnetic recording/reproducing apparatus including the magnetic recording/reproducing head according to the present invention. The magnetic recording/reproducing head is produced by the production method described in the third embodiment, and mounted on a head slider 600. The magnetic recording/reproducing apparatus illustrated in FIG. 11 rotates the magnetic recording medium 300 by a spindle motor 400, and guides the head slider 600 to a desired track on the magnetic recording medium 300 by an actuator 500. Specifically, in the magnetic disk apparatus, a reproduction head and a recording head formed on the head slider 600 are closely positioned on a predetermined recording position on the magnetic recording medium 300, and move relative to this position, thereby sequentially writing and reading a signal, by this mechanism. The actuator 500 is preferably a rotary actuator. The magnetic recording medium 300 may be a so-called continuous medium on which each bit is continuously present, or may be a so-called discrete track media on which a non-magnetic region that is unwritable by the recording head is formed between plural tracks. The magnetic recording medium 300 may also be a so-called patterned media including a non-magnet that fills a concave portion between convex magnetic patterns.

The recording signal is recorded on the medium by the recording head through a recording signal processing system 700, whereby the output from the reproduction head is obtained as a signal through the recording signal processing system 700. When the reproduction head is moved on the desired recording track, the position on the track can be detected by using the high-sensitive output from the reproduction head, and the actuator is controlled, whereby the head slider can be positioned. FIG. 11 illustrates only one head slider 600 and only one magnetic recording medium 300. However, plural head sliders and plural magnetic recording mediums may be used. The magnetic recording medium 300 may have recording information on both surfaces to record the information. When the information is recorded on both surfaces of the disk, the head slider 600 is arranged on both surfaces of the magnetic recording medium 300.

Eighth Embodiment

The spin torque oscillator according to the present invention can be applied not only to the magnetic recording head of MAMR system but also to magnetic information rewrite of a Magnetoresistive Random Access Memory (MRAM). For example, the high-frequency magnetic field oscillator according to the present invention is formed in the vicinity of a Magnetic Tunneling Junction (MTJ) of a memory cell, and the high-frequency magnetic field from the oscillator is used, whereby magnetization reversal can be caused with lower current than in the background art.

Figure 12:
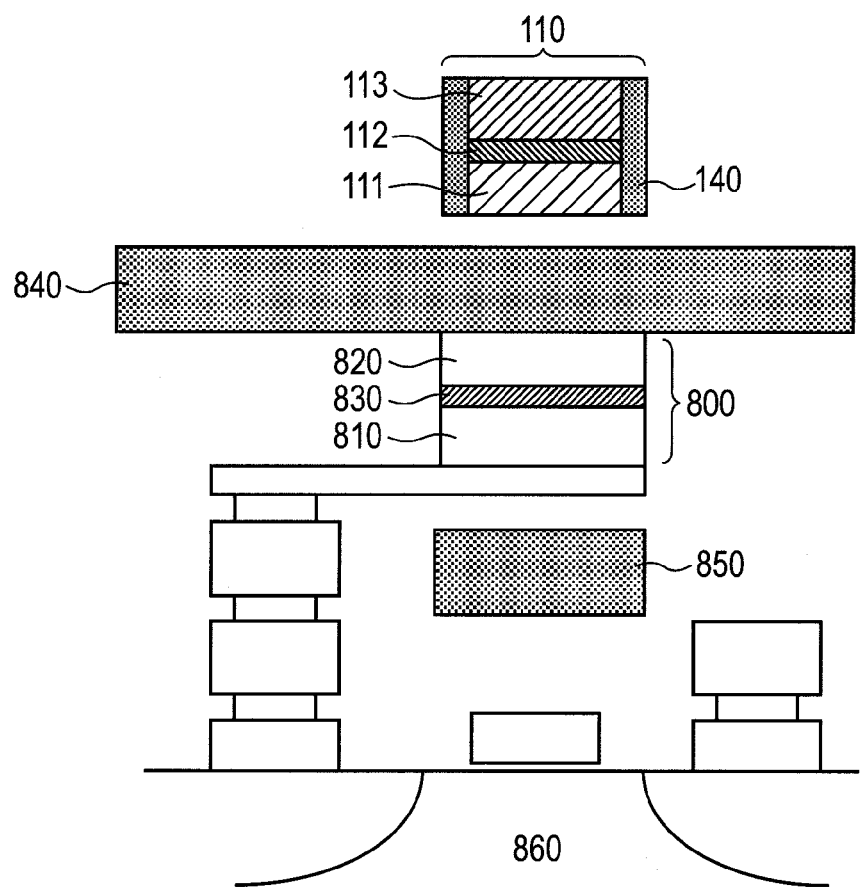
FIG. 12 is a schematic view illustrating a configuration of a magnetic memory.

FIG. 12 is a schematic sectional view illustrating an example of a configuration of the memory cell. A memory section 800 including a tunneling junction includes at least two magnetic layers 810 and 820, and a tunnel layer 830 formed between these layers and made of a non-magnet. Two magnetic layers 810 and 820 can be specified such that one of them is the pinned layer 810 in which magnetization is pinned to prevent the substantial rotation due to an external magnetizing field, and the other one is the free layer 820 in which the magnetization rotates due to the external magnetizing field.

Data is written into the memory cell in such a manner that the magnetization of the free layer 820 is reversed by a synthetic magnetizing field generated by flowing electric current on lines 840 and 850 serving as electrodes. In this case, the magnetization of the free layer 820 is excited according to ferromagnetic resonance (FMR) by using the high-frequency magnetic field from the oscillator 110. Therefore, the data is easy to be recorded on the magnetization, whereby the amount of current for recording can be reduced.

Data can also be written to the memory cell by a so-called spin injection magnetization switching, in which writing current is flown to the tunnel junction, not by using the synthetic magnetizing field from the writing lines. Even in this case, the amount of the writing current can be reduced by the high-frequency magnetic field from the oscillator 110.

According to the present embodiment, the microwave-assisted magnetic recording by the oscillator can be applied to the writing of the memory magnetization in MRAM, whereby magnetic information can be written to the tunnel junction with reduced current.

The present invention is not limited to the embodiments described above, and various modifications are possible. For example, the embodiments described above are described in detail for easy understanding of the present invention, and the present invention is not limited to those including all components described in the embodiments. Some configurations in a certain embodiment can be replaced by the configurations in other embodiments, and configurations in the other embodiments can be added to the configuration in a certain embodiment. Various additions, omissions, and substitutions in the other configurations can be made for some configurations in each embodiment.

What is claimed is:

1. A magnetic head comprising:
a main pole that generates a recording magnetic field; and
an oscillator that is provided close to the main pole for generating a high-frequency magnetic field, wherein
the oscillator has an oxide layer, a nitride layer, or an oxynitride layer, which is made of a material of the oscillator, on a side face orthogonal to an air bearing surface in a track width direction.

2. The magnetic head according to claim 1, wherein
the oxide layer, the nitride layer, or the oxynitride layer has a width of 0.5 nm or more in the track width direction, and the width of the oscillator except for the oxide layer, the nitride layer, or the oxynitride layer in the track width direction is 10 nm or more and 60 nm or less.

3. The magnetic head according to claim 1, wherein
the oscillator covered by the oxide layer, the nitride layer, or the oxynitride layer has a semi-circular shape projecting toward an element height direction from an air bearing surface.

4. A method for producing a magnetic head including a main pole that generates a recording magnetic field, and an oscillator that is provided close to the main pole for generating a high-frequency magnetic field, the method comprising:
a step of patterning the oscillator; and
a process step of oxidizing, nitriding, or oxynitriding at least one side face of the patterned oscillator orthogonal to an air bearing surface in the track width direction.

5. The method for producing a magnetic head according to claim 4, wherein
an oxide layer, a nitride layer, or an oxynitride layer with a thickness of 0.5 nm or more is formed by the process step.

6. The method for producing a magnetic head according to claim 4, wherein
the oxide layer, the nitride layer, or the oxynitride layer is formed on both sides of the oscillator in the track width direction and on a top surface of the oscillator in the element height direction by the process step, wherein a semi-circular region projecting toward the element height direction from the air bearing surface is left.

7. The method for producing a magnetic head according to claim 4, wherein
the process is an oxidation by ozone oxidation, an oxidation by plasma oxidation, or a process in which an oxygen ion is doped, and then, a heat treatment is performed.

8. The method for producing a magnetic head according to claim 4, wherein
the process includes a nitridation by plasma nitridation and a process of implanting a nitrogen ion.

9. A magnetic recording/reproducing apparatus comprising:
a magnetic recording medium;
a medium driving unit that drives the magnetic recording medium;
a magnetic head that performs a recording/reproducing operation to the magnetic recording medium; and
an actuator that positions a head slider on a desired track on the magnetic recording medium, wherein
the magnetic head includes a main pole that generates a recording magnetic field, and an oscillator that is provided close to the main pole for generating a high-frequency magnetic field, wherein the oscillator has an oxide layer, a nitride layer, or an oxynitride layer, which is made of a material of the oscillator, on a side face orthogonal to an air bearing surface in a track width direction.

10. A magnetic memory comprising:
an oscillator that generates a high-frequency magnetic field; and
an information recording section that records information by utilizing the high-frequency magnetic field generated from the oscillator, wherein
the oscillator has an oxide layer, a nitride layer, or an oxynitride layer, which is made of a material of the oscillator, on a side face orthogonal to an air bearing surface in a track width direction.

* * * * *